(12) United States Patent
Ito et al.

(10) Patent No.: US 6,991,270 B2
(45) Date of Patent: Jan. 31, 2006

(54) HOSE COUPLING ASSEMBLY

(75) Inventors: Koji Ito, Aichi-ken (JP); Naomi Nakashima, Aichi-ken (JP); Kenichi Mitsui, Aichi-ken (JP); Hiroshi Yamaguchi, Aichi-ken (JP); Yoshiaki Kameda, Aichi-ken (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 0 days.

(21) Appl. No.: 10/023,475

(22) Filed: Dec. 20, 2001

(65) Prior Publication Data

US 2002/0093198 A1 Jul. 18, 2002

(30) Foreign Application Priority Data

| Dec. 27, 2000 | (JP) | ................................ 2000-397868 |
| Aug. 13, 2001 | (JP) | ................................ 2001-245431 |
| Aug. 13, 2001 | (JP) | ................................ 2001-245442 |

(51) Int. Cl.
*A16L 21/00* (2006.01)

(52) U.S. Cl. ..................... 285/403; 285/903; 285/401; 285/360

(58) Field of Classification Search .............. 285/7, 285/84, 85, 292.1, 308, 309, 209, 360, 361, 285/376, 396, 401, 40, 403, 255, 86, 298, 285/314, 358
See application file for complete search history.

(56) References Cited

U.S. PATENT DOCUMENTS

| 1,033,187 A | * | 7/1912 | Metzger ..................... 285/376 |
| 4,332,402 A | | 6/1982 | Shellhause |
| 4,468,057 A | | 8/1984 | De Crombrugghe |
| 5,104,159 A | | 4/1992 | Sugiyama et al. |
| 5,190,224 A | * | 3/1993 | Hamilton ..................... 285/376 |
| 5,462,313 A | | 10/1995 | Rea et al. |
| 5,741,084 A | * | 4/1998 | Del Rio et al. ............. 285/361 |
| 5,882,048 A | | 3/1999 | Kawasaki et al. |
| 6,082,783 A | | 7/2000 | Kawasaki et al. |
| 6,206,433 B1 | * | 3/2001 | Bloomer ....................... 285/88 |
| 6,260,889 B1 | * | 7/2001 | Tozaki et al. ............... 285/321 |

FOREIGN PATENT DOCUMENTS

| DE | 43 05 609 A1 | 11/1993 |
| DE | 44 17 644 A1 | 11/1995 |
| DE | 197 27 518 A1 | 1/1999 |
| EP | 0 728 977 A1 | 8/1996 |
| EP | 0 992 729 A1 | 4/2000 |
| JP | 11-153278 | 6/1999 |
| NL | 1003540 | 1/1998 |

* cited by examiner

*Primary Examiner*—Aaron Dunwoody
(74) *Attorney, Agent, or Firm*—Posz Law Group, PLC

(57) ABSTRACT

A hose coupling assembly wherein a hose 20 having a corrugated portion 22 is coupled to a fitting block 24 by a socket 50. The fitting block 24 has a block engagement catch 25c projecting from the outside rim of the block body 25. The socket 50 comprises a socket body 51 elastically expandable and contractible by being divided by a slit 51a, and a socket engagement catch 51b engages the block engagement catch 25c. To detach the socket 50 from the fitting block 24, force is applied in a rotation direction to a push operation portion 51c to cause the socket body 51 to undergo diametrical expansion, releasing the socket engagement catch 51b from the block engagement catch 25c.

6 Claims, 33 Drawing Sheets

Fig.50
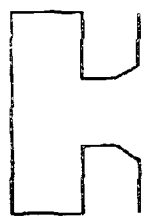
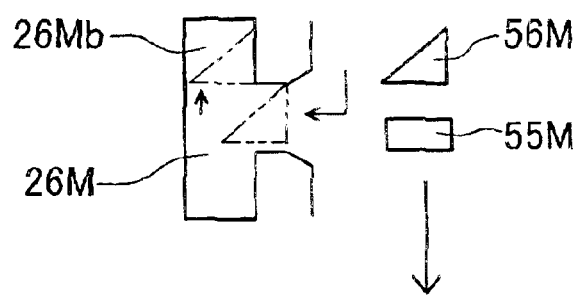
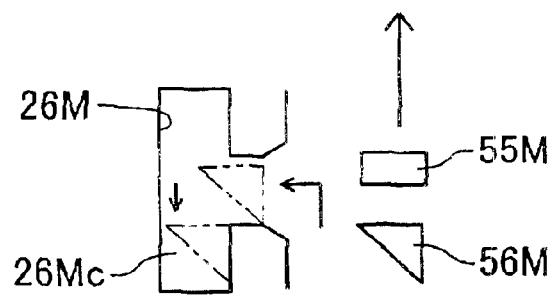

HOSE COUPLING ASSEMBLY

CROSS REFERENCE TO RELATED APPLICATIONS

This application claims priority from Japanese patent applications No. 2000-397868, filed on Dec. 27, 2000, No. 2001-245431, filed on Aug. 13, 2001, and No. 2001-245442, filed on Aug. 13, 2001 the complete disclosure of which are hereby incorporated herein by reference.

BACKGROUND OF THE INVENTION

1. Field of the Invention

The present invention relates to a hose coupling assembly for use with a hose, such as a car radiator hose.

2. Description of Related Art

A conventional hose coupling assemblies is described in JP 11-153278A. FIG. 51 is a sectional view of the hose coupling assembly taught in the prior art publication. In FIG. 52, a hose 120 is connected with a passage 102 in an engine block 100. The hose 120 is provided on the peripheral portion thereof with a corrugated portion 121; one of the corrugation grooves 121*a* serves as a housing groove 121*b*, with an O-ring 122 housed within the housing groove 121*b*. To connect the hose 120 to the passage 102, the corrugated portion 121 is pushed into a housing recess 104 of the engine block 100, and with the corrugated portion 121 in the compressed state, a detent fitting 128 is inserted into mounting holes 124*a*, 124*a* of a retainer block 124, as shown in FIG. 52. In this way the hose 120 is detained within the housing recess 104. In this state, the corrugated portion 121 is compressed in the diametrical direction, forcing the O-ring 122 against the side wall of the housing recess 104 so that the O-ring 122 provides a seal between the passage 102 and the hose 120.

However, the conventional hose coupling assembly requires laborious the procedure of inserting the detent fitting 128 to and from the small mounting holes 124*a*, 124*a* of the retainer block 124 for implementing the coupling and its reverse procedure for releasing the same.

Another prior art technique is disclosed in JP 6-50482A. The art comprises a hose having a first mating catch composed of a discrete element unified therewith by means of insert molding using a blow mold; and an associated member having a second mating catch formed on the rim thereof, so that the hose may be connected to the passage of the associated member by means of mating the first mating catch and second mating catch.

However, the prior art technique requires inserting the first mating catch in the blow mold for the hose and unifying it with the hose during molding thereof, which requires a rather complex mold and an additional insertion step, thus contributing to higher production cost. Further, once the hose is coupled, a special tool is required to remove it.

SUMMARY OF THE INVENTION

An aspect object of the present invention is to provide a hose coupling assembly offering ease of attachment/detachment and secure hose attachment, as well as reduced cost.

The present invention provides a hose coupling assembly for connecting a hose having a corrugated portion to an external passage. The hose coupling assembly comprises a fitting member including (i) a passage portion having a receiving passage, and (ii) a first engagement catch projecting outwardly from an open peripheral end of the passage portion. The hose coupling assembly also comprises a socket having (i) an elastically diametrically-expandable socket body for covering both of the fitting member and the corrugated portion, (ii) a second engagement catch, formed on the socket body, for engaging the first engagement catch, and (iii) a socket fitting portion, formed on an opening of the socket body, for mating with the corrugated portion. The socket is formed such that the connecting of the hose with the external passage with a tight seal is achieved by pressing the socket attached to the corrugated portion toward the fitting member to engage the second engagement catch with the first engagement catch. The socket is also formed such that the disengaging of the second engagement catch from the first engagement catch is achieved by expanding a diameter of the socket body.

With the hose coupling assembly herein, the hose attaches to the socket through engagement of the socket fitting portion with the corrugated portion. When the socket with the attached hose is pushed into the fitting member, the corrugated portion is forced into the receiving passage, and the second engagement catch of the socket engages the block-side mating catch. In this way the socket is mounted on the fitting member so that the hose connects to the external passage.

To detach the socket from the fitting member, the socket body is made to undergo diametrical expansion and is pulled out from the fitting member. That is, when the socket body undergoes diametrical expansion, the second engagement catch can disengage from the block-side mating catch due to outside diametrical expansion of the block-side mating catch. In this way, by applying force so as to bring about diametrical expansion of the socket body, the socket can be easily detached from the fitting member without the need for any special tool.

Further, since the socket and hose are separate elements, there is no need for an insert process, providing simpler fabrication.

There are a number of preferred embodiments for the elastically diametrical-expandable socket body, for example, a configuration produced by division thereof by means of a slit to form a cross section of C-shaped configuration or formed by division thereof into a plurality of arcuate elements, these arcuate elements being interlinked by arches.

Preferred supplemental means for diametrical expansion of the socket body include the following configurations.
(1) The fitting member may comprise a stopper for stopping rotation of the socket body when the socket body is rotated relative to the fitting member.
(2) The socket may comprise a push operation portion for applying force to the socket body rim in the direction of rotation.
(3) The fitting member may comprise a riser for shifting the socket body to the outside diameter side when the socket is rotated.
(4) The fitting member may comprise a diametrical expansion projection for pushing the socket body to expand its diameter when the socket body rotates relative to the fitting member.
(5) The socket body may comprise a guide for guiding the diametrical expansion projection.

As yet another embodiment, there may be provided a diametrical expansion restricting member, installed on the socket body extending over the slit, for restricting diametrical expansion of the socket body. With this arrangement, the socket body—which is divided by a slit—will not undergo diametrical expansion even when subjected to strong force exerted in the hose decoupling direction, thus preventing the hose from decoupling.

Further, by designing the socket such that the diametrical expansion restricting member cannot be engaged by the socket if the socket is not completely installed on the passage portion, correct installation procedure can be assured.

As a preferred embodiment of the diametrical expansion restricting member, the member may comprise: an arcuate restricting member body conforming to contour of the socket body and a catch portion formed on the inside peripheral wall of the restricting member body, engageable on the exterior surface of the socket body and mating therewith in the direction of hose insertion. Or, the diametrical expansion restricting member may comprise a push operation portion projecting from the exterior surface of the restricting member body, for applying attaching/detaching force in the direction of insertion. This push operation portion facilitates attachment/detachment of the diametrical expansion restricting member.

As yet another preferred embodiment, there may be provided temporary attaching means for extending over the passage portion and the diametrical expansion restricting member to temporarily attach the diametrical expansion restricting member to the socket when the hose is not attached to the socket. With this arrangement, by temporarily attaching the diametrical expansion restricting member to the socket during shipping etc. of the socket and restricting member, the parts are not separate, making handling easier. As a preferred embodiment, the temporary attaching means may be designed to temporarily attach the diametrical expansion restricting member at midpoint in the insertion direction.

In another preferred embodiment, the diametrical expansion restricting member may comprise a restricting member body having an arcuate face conforming to the exterior face of the socket body and an engaging pin projecting from the arcuate face and engageable by the socket body or may extend across the slit and consist of wire bent so as to be engaged by the socket body.

The other invention is to provide with a hose coupling assembly for connecting a hose having a corrugated portion to an external passage. The hose coupling assembly comprises a fitting member including (i) a tubular portion having a receiving passage and substantially a same outer diameter as the hose, and (ii) a first engagement catch formed on an open end of the passage portion. The hose coupling assembly also comprises a socket including (i) an annular socket body having a slit across the entirety of the length of the socket, the socket body having a maximum outer diameter which is substantially same outside diameter as an outer diameter of the tubular portion, (ii) a linking portion for linking the socket body over the split, the linking portion being expandable and contractable; (iii) a second engagement catch for engaging the first engagement catch, formed on the socket body; and (iv) a socket fitting portion for mating with the corrugated portion, situated on an opening of the socket body. The socket is formed such that the connecting of the hose with the external passage with a tight seal is achieved by deforming the linking portion due to shift of a circumferential position to engage the second engagement catch with the first engagement catch.

According to the hose coupling assembly herein, the hose can be attached to the socket by mating the socket fitting portion with the corrugated portion. The socket with the attached hose is inserted into the passage portion of the fitting member, whereupon the corrugated portion enters the receiving passage and the linking portion linking the split the socket body expands and contracts to change the circumferential position of the second engagement catch, so that the second engagement catch engages the first engagement catch. In this way the socket is connected in the fitting member, to connect the hose to the external passage.

The socket has about the same diameter as the passage portion, and when connected in the passage portion has substantially the same outside diameter. Accordingly, the socket does not protrude out from the passage portion, which is an advantage when routing it through a confined engine room.

In a preferred embodiment of the hose coupling assembly, the block-side mating portion is a mating slot formed at the open end of the passage portion, and the second engagement catch is a second engagement claw that mates in the mating slot. With this arrangement, when the socket engagement catch is forced into the mating slot, it can become engaged in the mating slot by expansion/contraction of the linking portion.

In a preferred embodiment, the socket comprises a guide situated at a first end of the split socket body linked via the linking portion and overlapping a second end when the linking portion is expanded and is designed to allow the circumferential position of the second engagement catch to change while maintaining substantially the same diameter.

In another preferred embodiment of the socket, two ends of a split socket body are respectively linked by means of linking portions, with a first linking portion contracting when a second linking portion expands, so as to shift the circumferential position of the second engagement catches while maintaining substantially the same diameter.

In a preferred embodiment, the mating slots comprise guide slots situated at equal intervals around the circumference of the socket, and detent slots extending to both sides from the bottoms of guide recesses, and extending in the circumferential direction. With this arrangement, the second engagement catches, after entering the guide slots, can be latched within detent slots in either direction along the circumferential, thus facilitating positioning of the socket.

BRIEF DESCRIPTION OF THE DRAWINGS

FIG. 50 shows a process for engaging the socket engagement catches of the socket within the block engagement slots at a different location than in FIG. 49;

DETAILED DESCRIPTION OF THE INVENTION (1) First Embodiment

Figure 1:
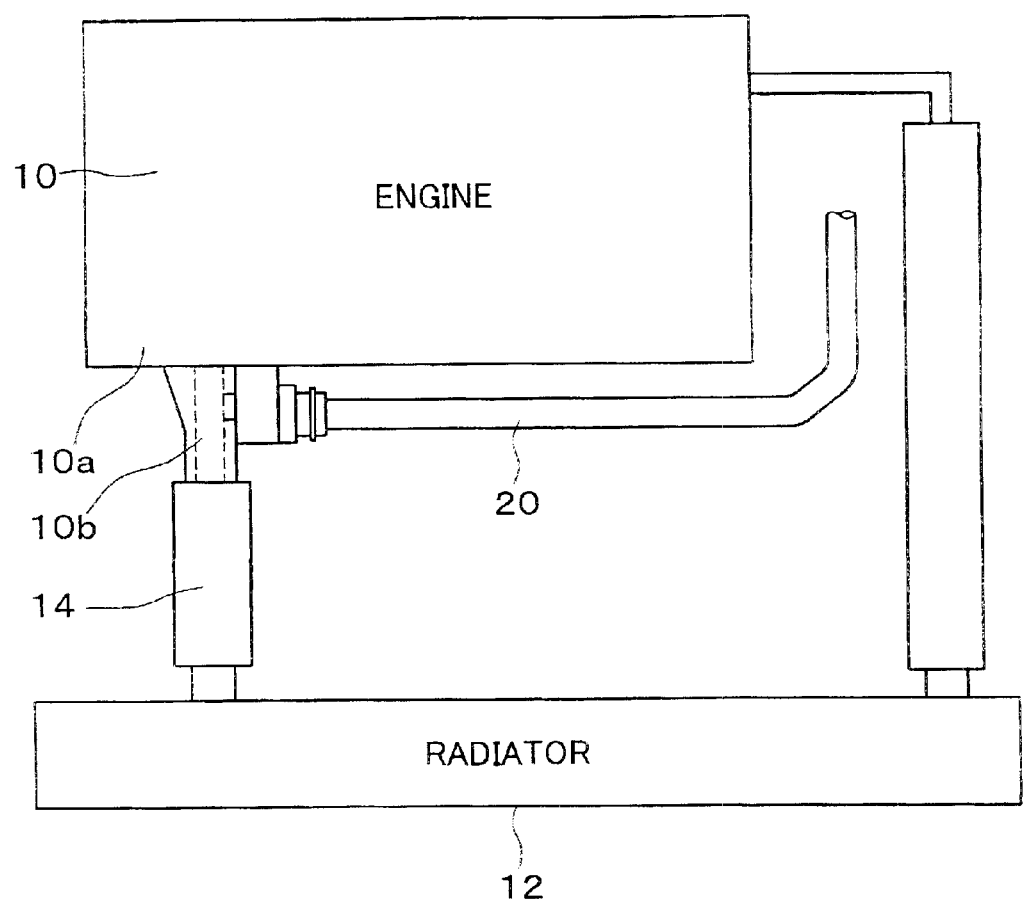
FIG. 1 shows the surrounding area of an automobile engine employing a hose coupling assembly which pertains to a first embodiment of the invention.

FIG. 1 is a diagram of the surrounding area of an automobile engine employing a hose coupling assembly which pertains to a first embodiment of the invention. In FIG. 1, an engine 10 has engine block 10a on the edge portion. The engine block 10a is connected to a coolant passage 10b for supplying coolant water to the radiator 12. A radiator hose 14 is coupled to this coolant passage 10b. A bypass hose 20 branching from radiator hose 14 is connected to the coolant passage 10b. This hose 20 provides a bypass to avoid circulating coolant water to the radiator 12 when engine 10 temperature is low.

Figure 2:
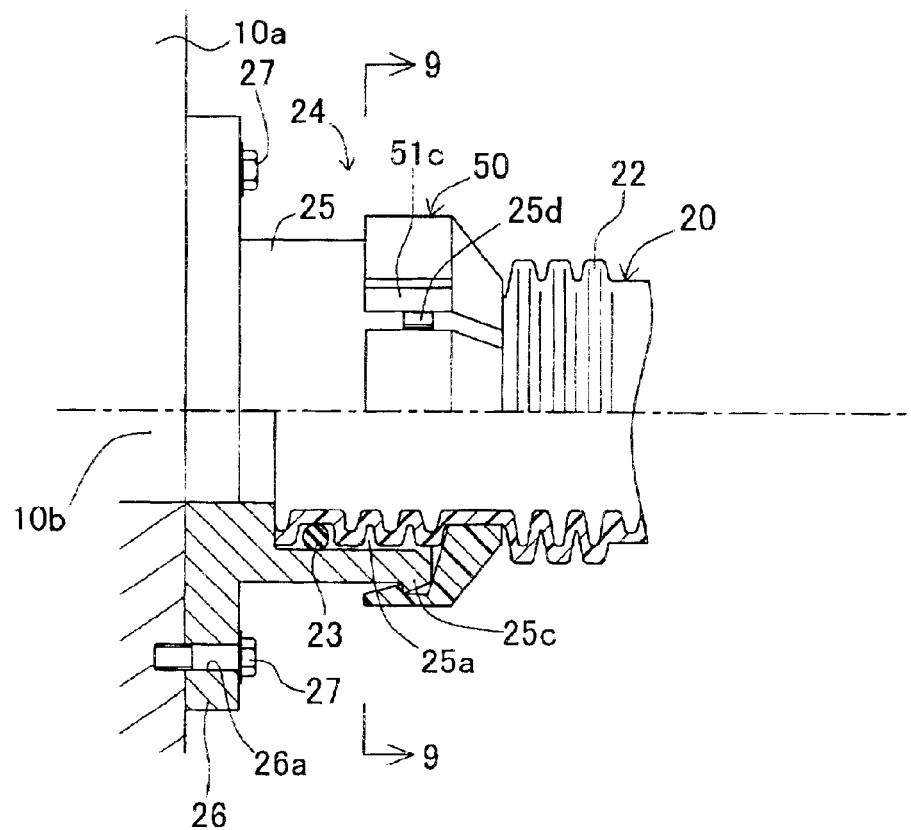
FIG. 2 is a half-sectional view showing the state at which a hose connects with a coolant passage of an engine block.

FIG. 2 is a half-sectional view showing the state at which the hose 20 connects with the coolant passage 10b of the engine block 10a. As shown in FIG. 2, the hose 20 is connected to the coolant passage 10b by means of a sealing member 23, a fitting block 24 and a socket 50.

Figure 3:
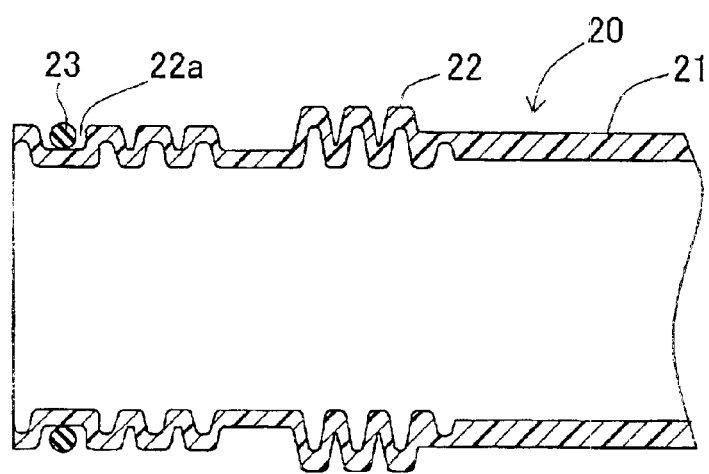
FIG. 3 is a sectional view of the end of the hose.

Description of the individual elements follows. FIG. 3 is a sectional view of the end of hose 20. The hose 20 has a corrugated portion 22 of predetermined length situated at the end of a normal ordinary portion 21. The sealing member 23 made as an O-ring is installed in a corrugation groove 22a of the corrugated portion 22. The resin material of corrugated portion 22 may made, for example, of a single layer of nylon 12 (PA12) or polyphenylene sulfide (PPS), or an inner layer of PPS and an outer layer of PA12.

Figure 4:
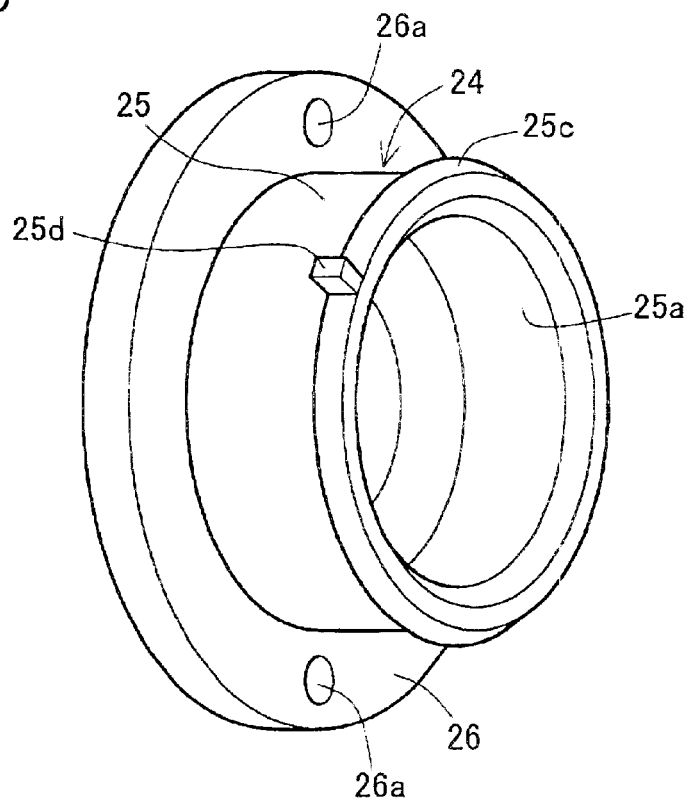
FIG. 4 is a perspective view showing a fitting block.

FIG. 4 is a perspective view showing the fitting block 24. The fitting block 24 comprises a round tubular block body 25 and a flange 26 projecting outwardly from the end of block body 25; these elements are integrally fabricated of metal. As shown in FIG. 2, block body 25 comprises a receiving passage 25a for insertion of the hose 20, and a passage 25b communicating with this receiving passage 25a. The passage 25b interconnects with the coolant passage 10b. The flange 26 is an element for attaching fitting block 24 to the engine block 10a, and is provided with through-holes 26a, 26a for insertion of bolts 27, 27.

Around the entire circumference of the rim of the open end of block body 25 projects up a block engagement catch 25c for mounting the socket 50. As shown in FIG. 4, a projecting stopper 25d of rectangular cross section is provided on a portion of the block engagement catch 25c.

Figure 5:
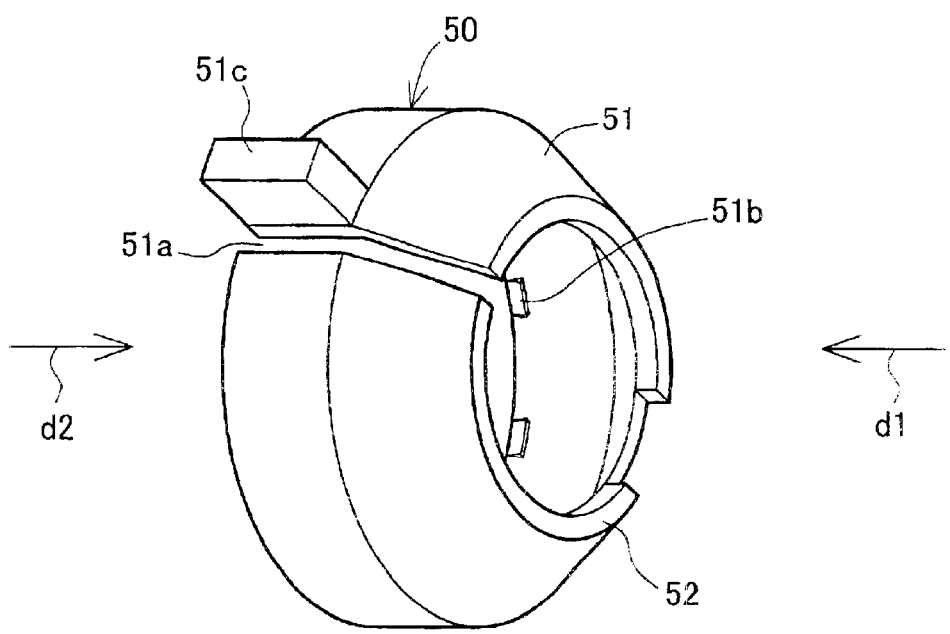
FIG. 5 is a perspective view of a socket.
Figure 6:
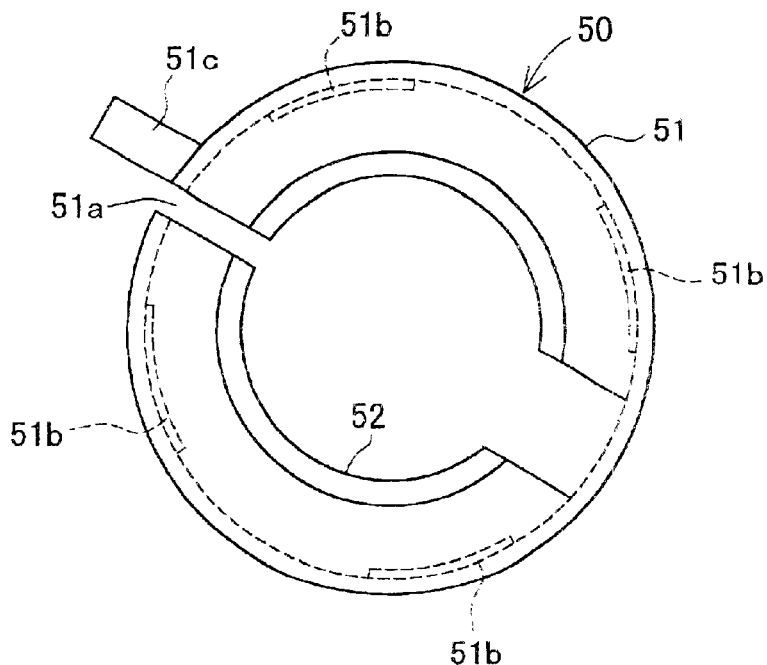
FIG. 6 is a view as seen in the direction of arrow d1 in FIG. 5.
Figure 7:
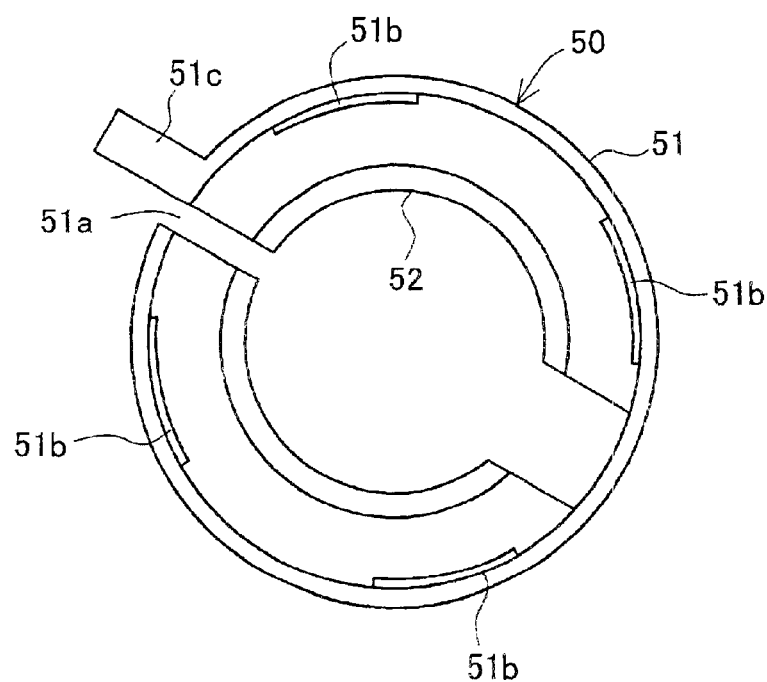
FIG. 7 is a view as seen in the direction of arrow d2 in FIG. 5.

FIG. 5 is a perspective view of the socket 50; FIG. 6 is a view as seen in the direction of arrow d1 in FIG. 5; and FIG. 7 is a view as seen in the direction of arrow d2 in FIG. 5. The socket 50 is an element for engaging the corrugated portion of the hose 20 and attachment to the fitting block 24. The socket 50 comprises a socket body 51 having a cross section of C-shaped configuration, divided by a slit 51a. The socket body 51 is made of resin material capable of elastic diametrical expansion, such as polypropylene, polyamide, or polycarbonate. In proximity to the opening of the socket body 51 is formed a socket fitting portion 52 for engaging the corrugated portion 22 (FIG. 2) to detain the hose 20.

As shown in FIGS. 2 and 7, on the inside rim of the opening of the socket body 51 is formed an socket engagement catch 51b for engaging the block engagement catch 25c to effect attachment to the fitting block 24. The socket engagement catch 51b projects out from four equidistant locations on the circumference. On the outside rim of socket body 51 in proximity to the slit 51a is formed a push operation portion 51c. The push operation portion 51c projects out from the outside rim of the socket body 51 to allow rotational force to be applied with the fingers in order to expand the diameter of the socket body 51.

Figure 8:
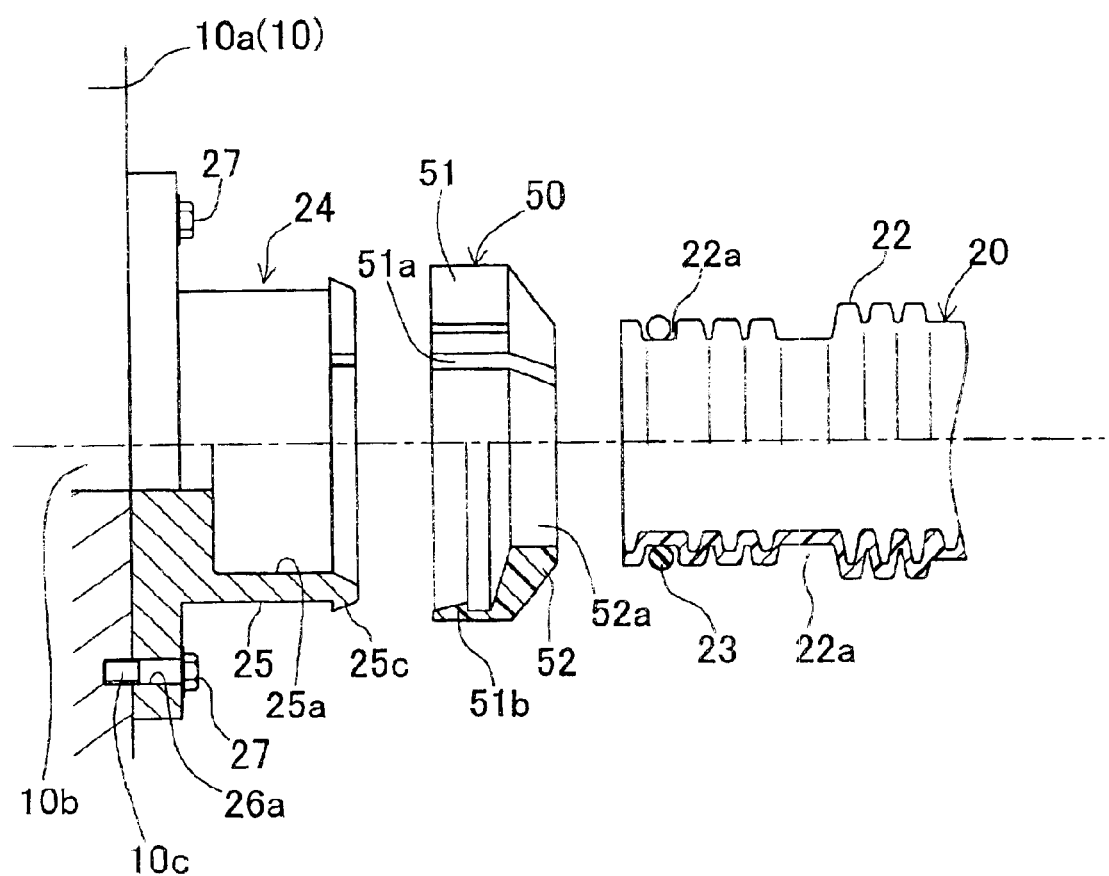
FIG. 8 is a half-sectional view of the hose coupling assembly prior to assembly.

The procedure for connecting the hose 20 to the coolant passage 10b of the engine 10 is now described. FIG. 8 is a half-sectional view of the hose coupling assembly prior to assembly. First, the fitting block 24 is placed against the engine block 10a, and the fitting block 24 is secured to the engine block 10a by the passing bolts 27, 27 through the through-holes 26a, 26a and tightening them in the bolt holes 10c, 10c.

Figure 9:
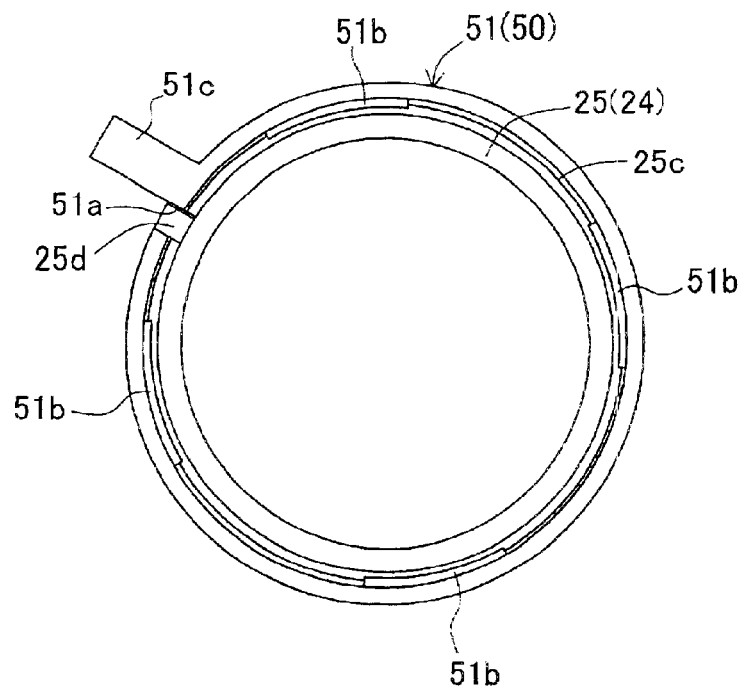
FIG. 9 shows the socket mounted on the fitting block.

Next, the sealing member 23 is installed in the corrugation groove 22a on the hose 20, and the end of the hose 20 is forced into the socket 50 through the opening 52a thereof. During this process, the socket body 51—being divided by the slit 51a—expands in diameter, thereby facilitating insertion of the corrugated portion 22 so that the corrugated portion 22 easily inserts all the way into the socket 50. The socket fitting portion 52 engages the corrugation groove 22a of the corrugated portion 22. When the socket 50 with the attached hose 20 is subsequently pushed into the fitting block 24, the corrugated portion 22 inserts into receiving passage 25a, and the socket engagement catch 51b of the socket 50 engages with the block engagement catch 25c. As shown in FIG. 9—an end view taken along line 9—9 in FIG. 2—the socket engagement catch 51b at four locations engages with the block engagement catch 25c to attach the socket 50 to the fitting block 24. In this way the sealing member 23 is pressed tightly against the inside wall of the receiving passage 25a to produce a seal, whereby the hose 20 is connected to the coolant passage 10b of the engine block 10a.

According to the hose coupling assembly pertaining to the first embodiment, by premounting the fitting block 24 on the engine block 10a, the hose coupling procedure may be accomplished by means of a simple procedure that simply involves pushing the socket 50 onto the fitting block 24.

Figure 10:
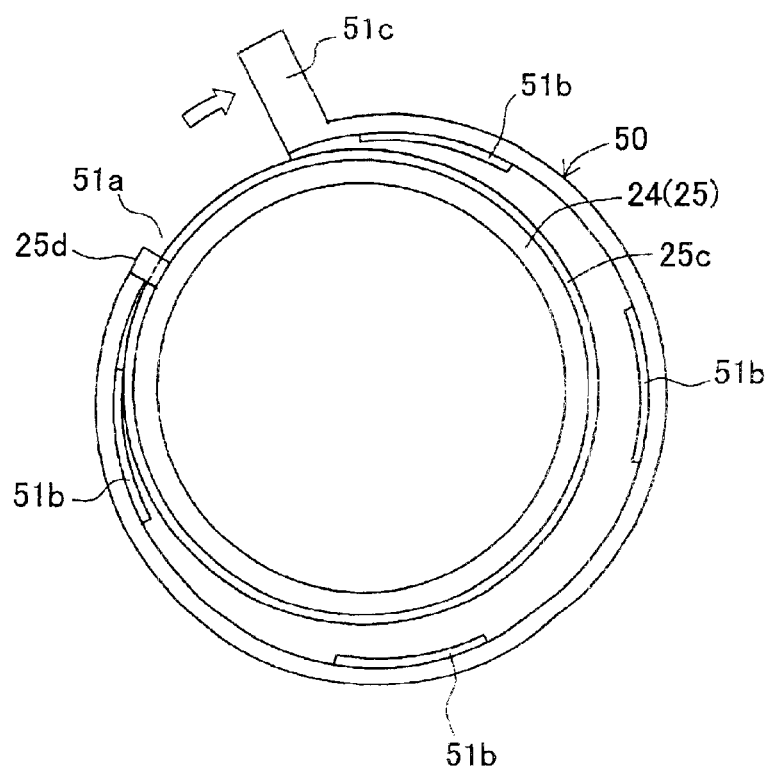
FIG. 10 shows the process for releasing the socket from the state shown in FIG. 9.

The procedure for detaching the socket 50 from the fitting block 24 is now described. From the state depicted in FIG. 9, when force is applied in the rotational direction to the push operation portion 51c of the socket 50, as shown in FIG. 10, rotation of the end of the slit 51a in the socket body 51 is halted by the stopper 25d, so that the socket body 51 expands in diameter. In this state, the socket engagement catch 51b expands beyond the outside diameter of the block engagement catch 25c allowing the socket engagement catch 51b to be released from the block engagement catch 25c. That is, while the socket engagement catch 51b is engaged securely with the block engagement catch 25c, the socket 50 may be easily detached from the fitting block 24 by applying force in the rotational direction to the push operation portion 51c.

Thus, according to the first embodiment, the socket 50 can be preinstalled on the corrugated portion 22 and then attached by being pushed into the fitting block 24, and can be detached from the fitting block 24 by applying force in the rotational direction to the push operation portion 51c to expand the diameter of the socket 50, without the need for any special tool, thus providing an easy attachment and detachment operation.

As the socket 50 is a separate element from the hose 20, unlike the prior art, there is no need for an insert process, making for a simpler fabrication process.

(2) Second Embodiment

Figure 11:
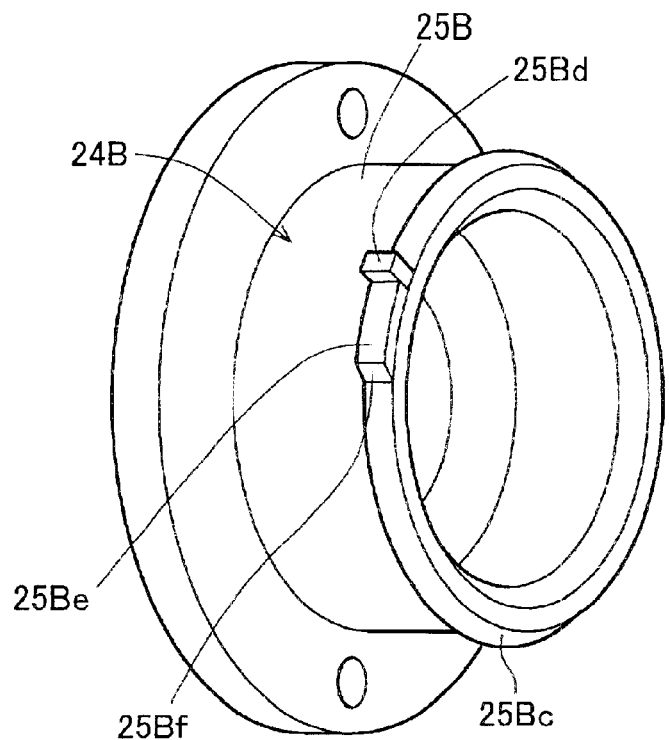
FIG. 11 is a perspective view of a fitting block pertaining to a second embodiment.
Figure 12:
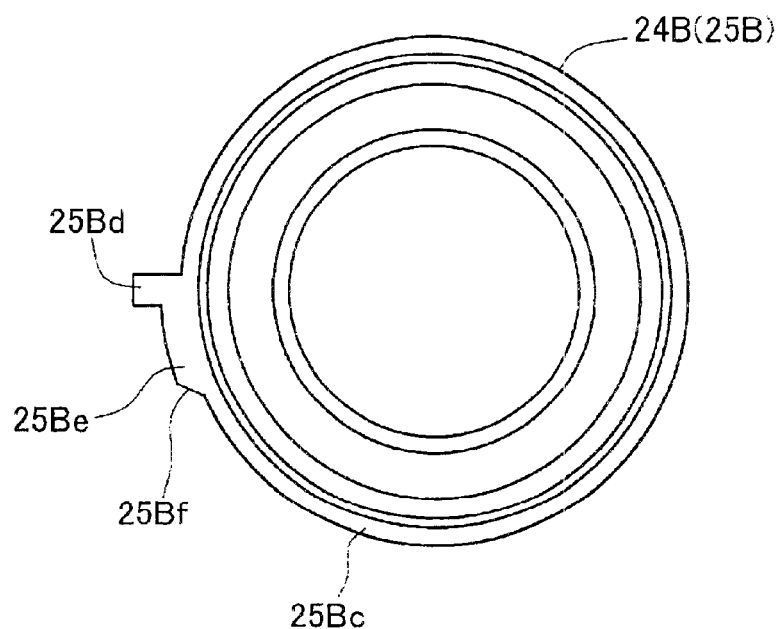
FIG. 12 is a side view of the fitting block.
Figure 13:
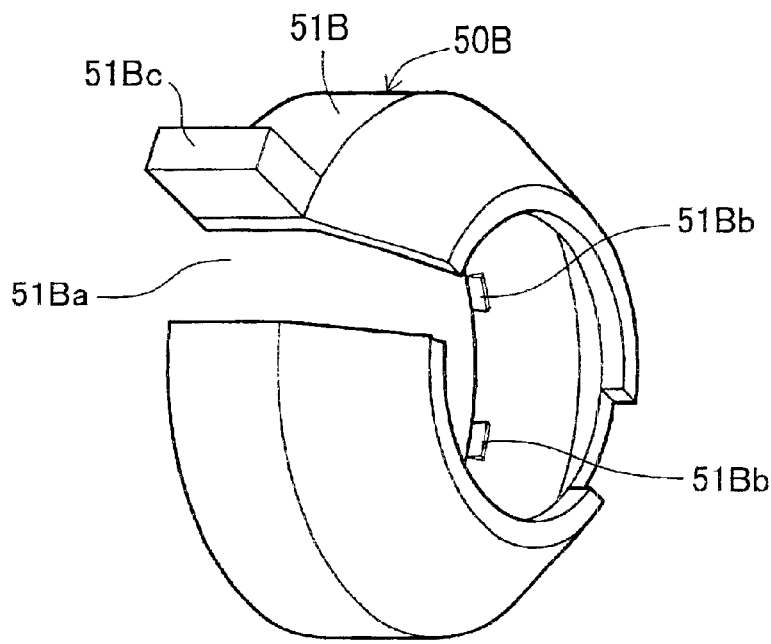
FIG. 13 is a perspective view of a socket.
Figure 14:
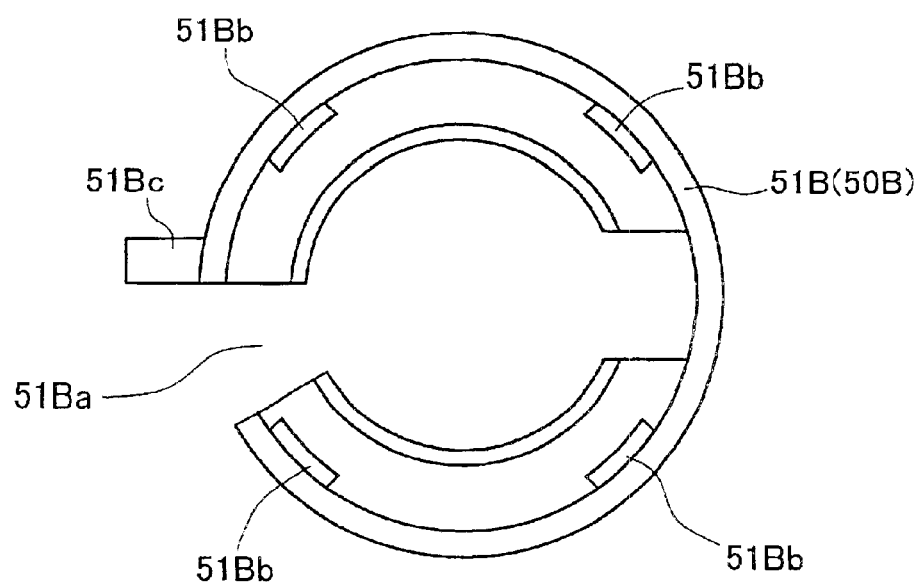
FIG. 14 is a side view of the socket.

FIG. 11 is a perspective view of a fitting block 24B pertaining to a second embodiment; and FIG. 12 is a side view of the fitting block 24B. The second embodiment features the fitting block 24B configuration for releasing a socket 50B. In FIGS. 11 and 12, a stopper 25Bd projects from the outside rim of the opening of the fitting block 24B, and a riser 25Be having a width equivalent to 30° around the circumference projects therefrom in proximity to the stopper 25Bd. One end of the riser 25Be is a sloping face 25Bf. FIG. 13 is a perspective view of the socket 50B; and FIG. 14 is a side view of the socket 50B. A socket body 51B of the socket 50B has formed therein a slit 51Ba of width equal to that of the riser 25Be.

As the procedure for attaching the hose 20 to the fitting block 24B with the socket 50B is similar to that in the first embodiment, the following discussion relates to the procedure for detaching the socket 50B from the fitting block 24B.

Figure 15:
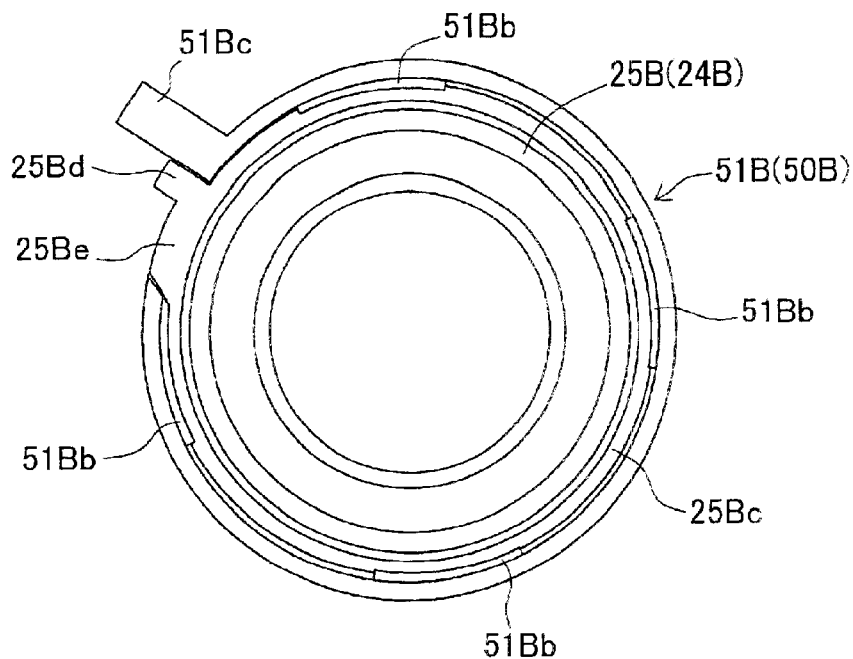
FIG. 15 shows the socket mounted on the fitting block.
Figure 16:
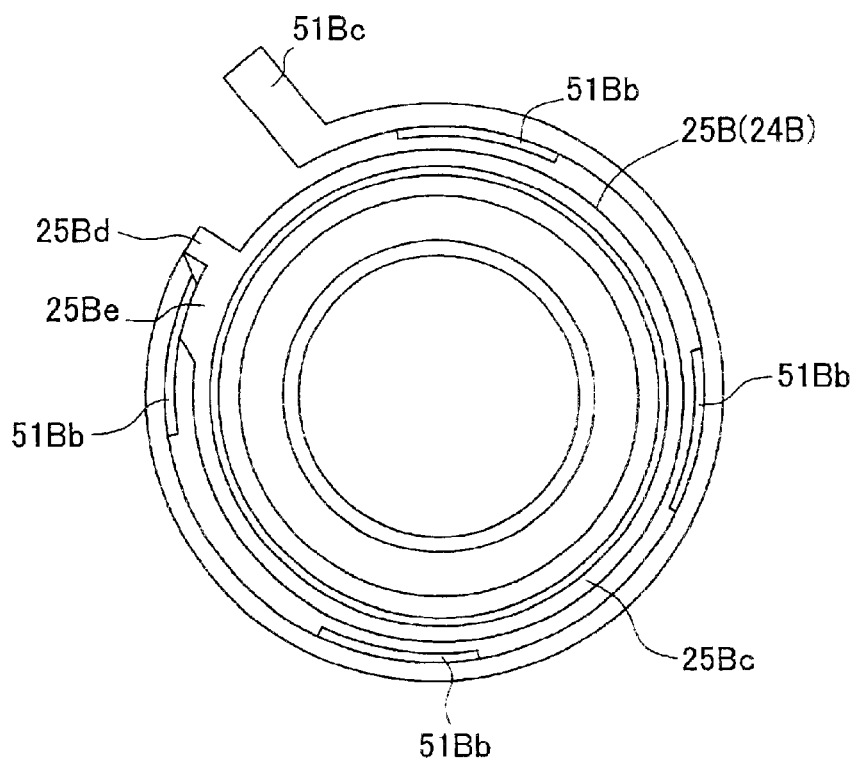
FIG. 16 shows the process for releasing the socket from the state shown in FIG. 15.

In the coupled state shown in FIG. 15, force is applied in the rotational direction to the push operation portion 51Bc of the socket body 51B, whereupon the end of the slit 51Ba rides up over the riser 25Be as shown in FIG. 16, and is stopped by the stopper 25Bd. As a result, the center axis of the socket body 5B is brought into proximity with the center axis of the fitting block 24B, i.e., it expands in diameter to a shape approximating a concentric circle. Accordingly, the socket engagement catch 51Bb can be readily disengaged from the block engagement catch 25Bc without appreciable diametrical expansion of socket 50B.

(3) Third Embodiment

Figure 17:
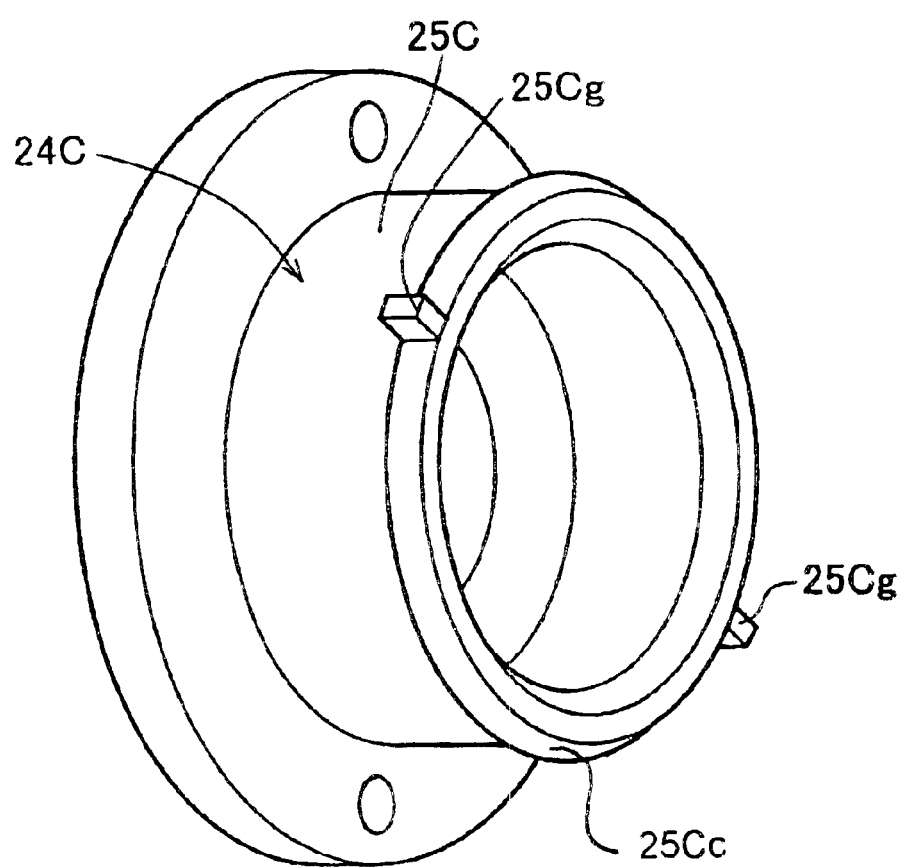
FIG. 17 is a perspective view of a fitting block pertaining to a third embodiment.
Figure 18:
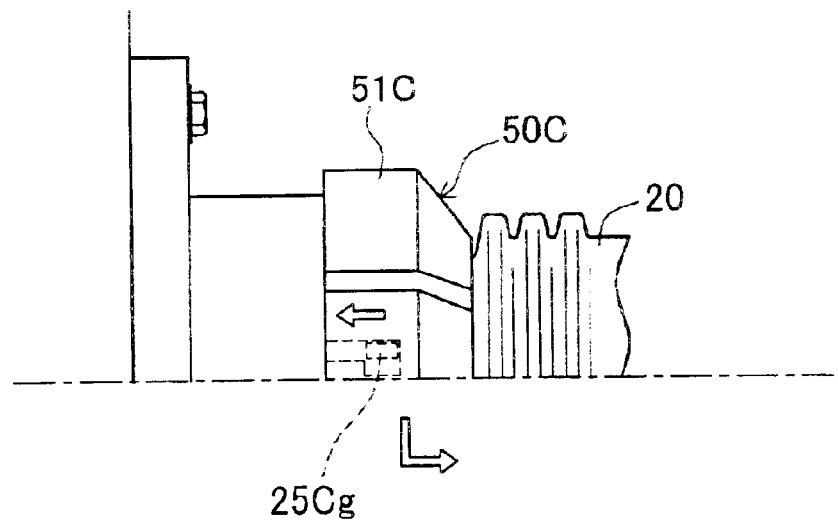
FIG. 18 is a half-sectional view showing a hose coupling assembly.
Figure 19:
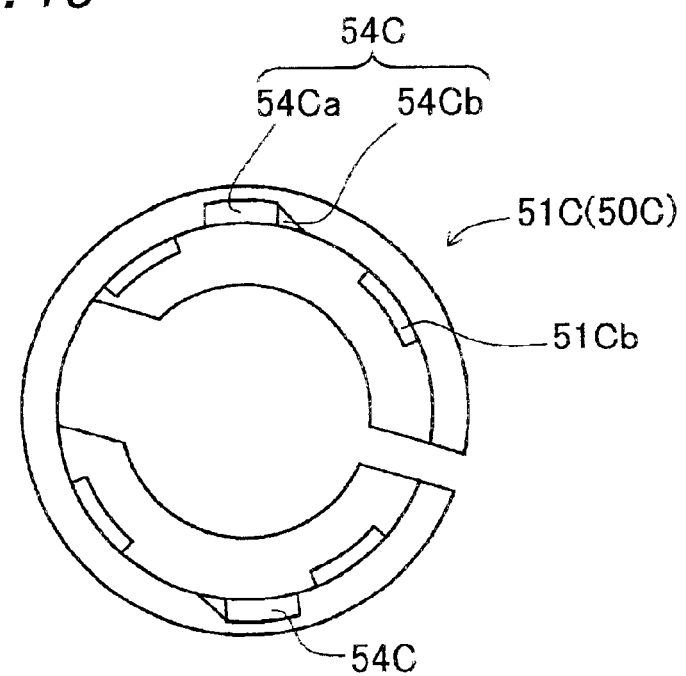
FIG. 19 is a side view of a socket.

FIG. 17 is a perspective view of a fitting block 24C pertaining to a third embodiment; FIG. 18 is a half-sectional view of the hose coupling assembly; and FIG. 19 is a side view of a socket 50C. The third embodiment features an arrangement for restricting the amount of diametrical expansion of the socket 50C. In FIG. 17, diametrical expansion projections 25Cg, 25Cg are formed on the outside rim of the opening of the fitting block 24C. On the inside rim of a socket body 51C, shown in FIGS. 18 and 19, are formed guides 54C, 54C for guiding the diametrical expansion projections 25Cg, 25Cg. The guides 54C, 54C are slots formed on the inside peripheral surface of the socket body 51C, each comprising a guide slot 54Ca extending in the axial direction and an inclined slot 54Cb deflected at a right angle from the guide slot 54Ca and extending in the circumferential direction.

Figure 20:
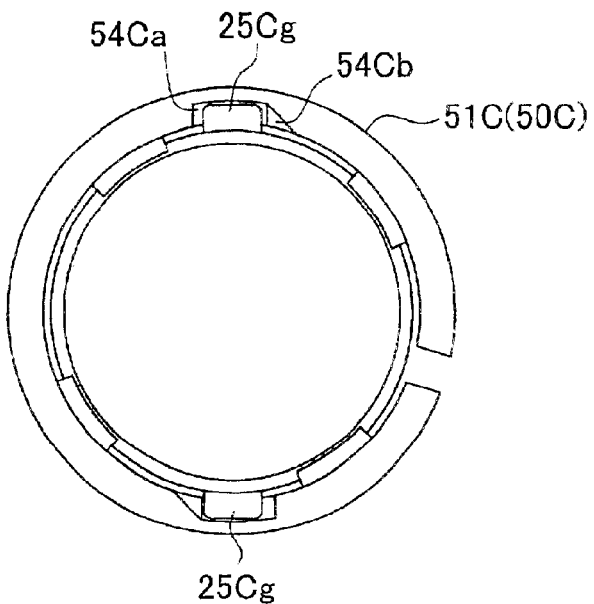
FIG. 20 shows the socket mounted on the fitting block.

To attach the socket 50C to the fitting block 24C, the guide slots 54Ca of the guides 54C, 54C are aligned with the diametrical expansion projections 25Cg, 25Cg, and the socket 50C is then pushed in. This causes the socket engagement catch 51Cb to ride over the block engagement catch 25Cc and become engaged (state shown in FIG. 20).

Figure 21:
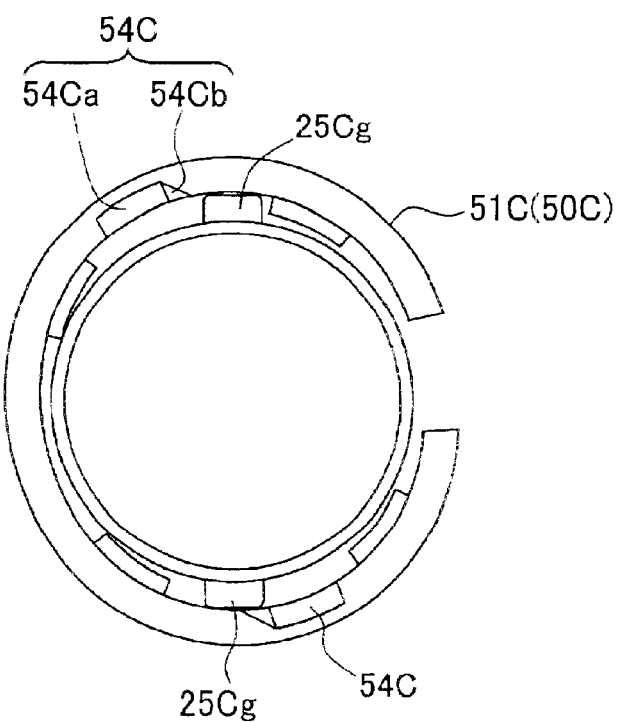
FIG. 21 shows the process for releasing the socket from the state shown in FIG. 20.

To release the socket 50C from the fitting block 24C, first, the socket 50C is rotated as shown in FIG. 21. This causes the diametrical expansion projections 25Cg, 25Cg to ride on the inclined slots 54Cb of the guides 54C, 54C, so that the socket body 51C expands in diameter. By subsequently pulling the socket 50C away from the fitting block 24C in the axial direction, the socket engagement catch 51Cb is released from the block engagement catch 25Cc.

According to the third embodiment, the amount of diametrical expansion of the socket body 51C is dependent upon height when riding up the diametrical expansion projections 25Cg, 25Cg, thus preventing damage to the socket body 51C resulting from excessive diametrical expansion.

(4) Fourth Embodiment

Figure 22:
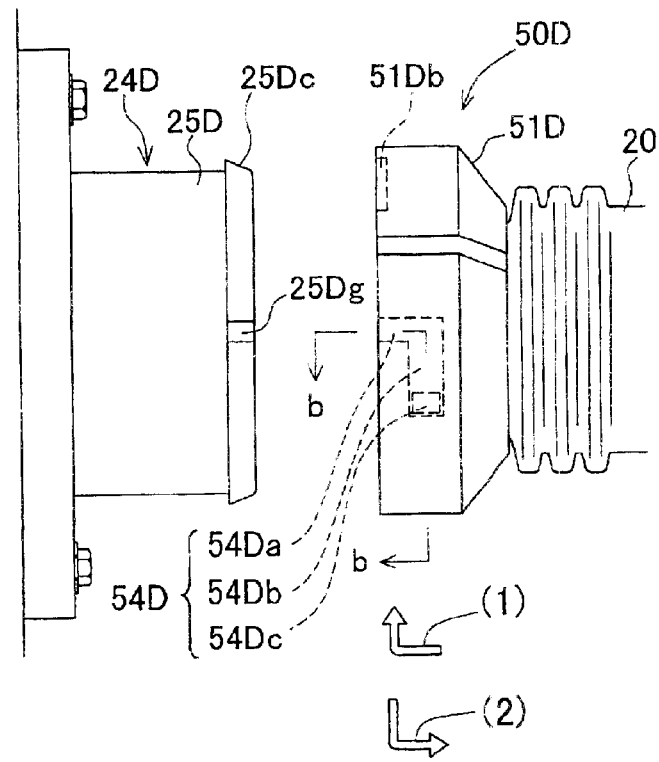
FIG. 22 is a side view showing a socket prior to attachment to a fitting block according to a fourth embodiment.
Figure 23:
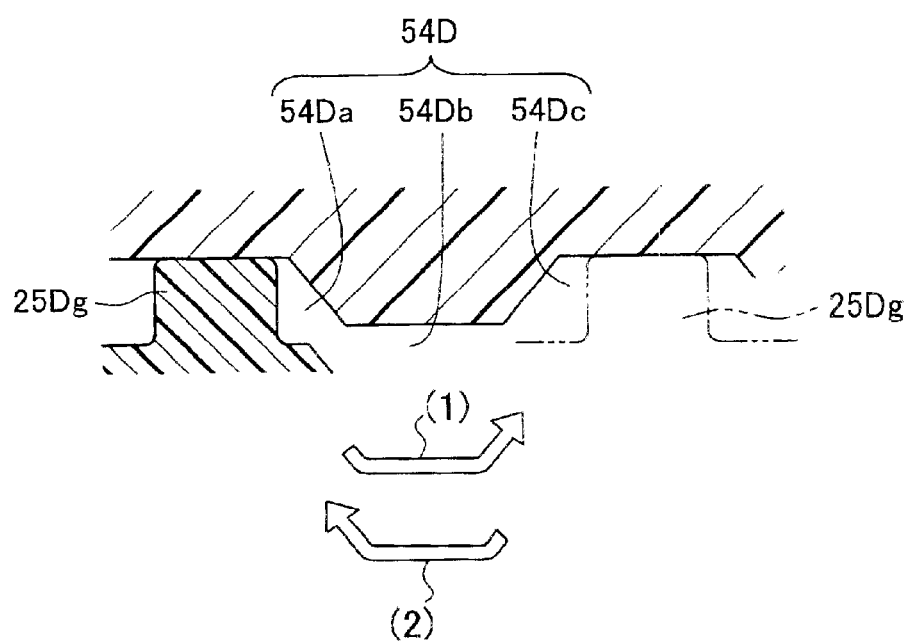
FIG. 23 shows the socket of FIG. 22 taken along line b—b.

FIG. 22 relates to a fourth embodiment and is a side view showing a socket 50D prior to attachment to a fitting block 24D. The fourth embodiment features a different configuration for the guide of the third embodiment. Specifically, the inside peripheral face of a socket body 54D has two L-shaped guides 54D (one of these is indicated by a broken line) situated at an axially symmetrical location. The guide 54D comprises a U-shaped guide slot 54Da, a diametrical expansion riser 54Db, and a positioning recess 54Dc. FIG. 23 is an illustrative diagram of the socket 50D of FIG. 22 taken along line b—b. The guide slot 54Da extends from the end of the socket body 51D at an angle to its axis. The diametrical expansion riser 54Db is a riser that projects diametrically inward from the guide slot 54Da and the positioning recess 54Dc, in order to expand the diameter of the socket body 51D. The positioning recess 54Dc is a recess for positioning the diametrical expansion projection 25Dg.

Route (1) is used to attach the socket 50D to the fitting block 24D. The guide slot 54Da of the guide 54D is aligned with the diametrical expansion projection 25Dg, the socket 50D is pushed in, and the socket 50D is then rotated so that the diametrical expansion projection 25Dg is positioned by the positioning recess 54Dc. After the diametrical expansion projection 25Dg has passed the diametrical expansion riser 54Db, the socket engagement catch 51Db engages the block engagement catch 25Dc.

Route (2), on the other hand, is used to remove the socket 50D from the fitting block 24D. The socket 50D is rotated in the reverse direction and then pulled off. During this process, as the diametrical expansion projection 26Dg rides up over the diametrical expansion riser 54Db of the guide 54D, and the socket body 51D undergoes diametrical expansion so that the socket engagement catch 51Db is released from the block engagement catch 25Dc. In this embodiment as well, the amount of diametrical expansion of the socket body 51D is dependent upon height when the diametrical expansion projection 25Dg rides up over the diametrical expansion riser 54Db, so the socket body 51D does not undergo excessive diametrical expansion.

(5) Fifth Embodiment

Figure 24:
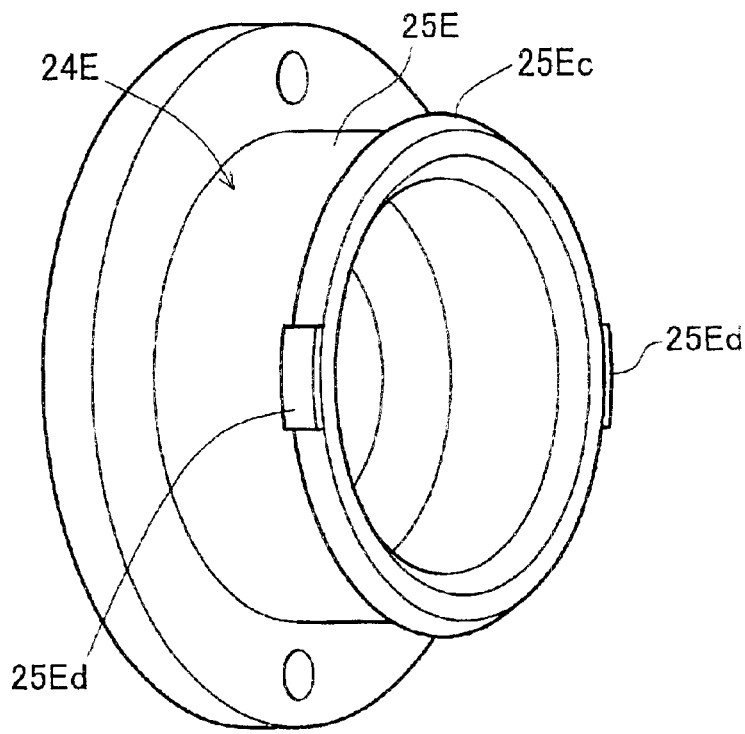
FIG. 24 is a perspective view of a fitting block pertaining to a fifth embodiment.
Figure 25:
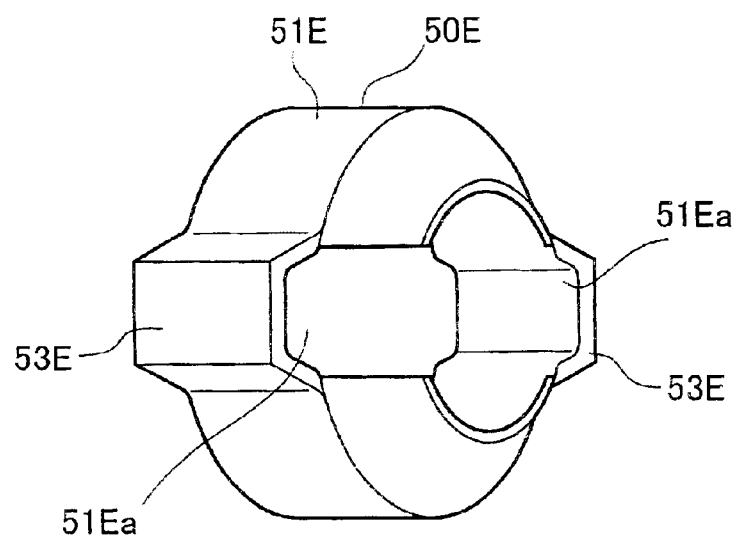
FIG. 25 is a perspective view of the socket.
Figure 26:
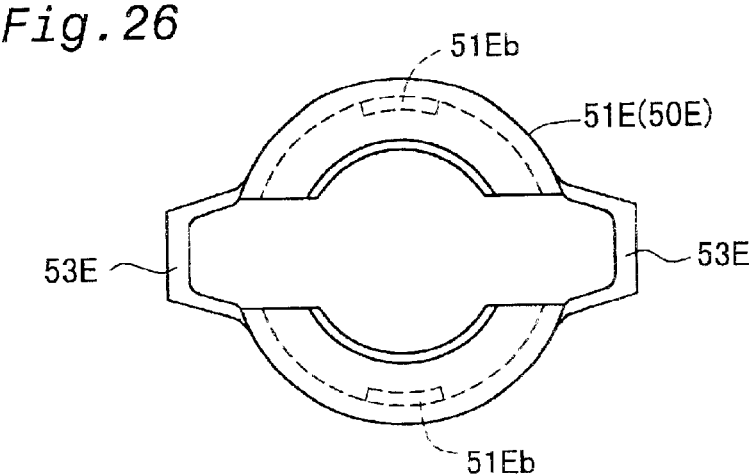
FIG. 26 is a side view of the socket.

FIG. 24 is a perspective view of a fitting block 24E pertaining to a fifth embodiment; FIG. 25 is a perspective view of a socket 50E; and FIG. 26 is a side view of the socket 50E. The fifth embodiment features a different configuration for the socket 50E. In FIG. 24, the outer rim of the opening of the fitting block 24E has stoppers 25Ed, 25Ed arranged thereon in axially symmetric fashion. The socket 50E depicted in FIG. 25 is divided by slits 51Ea, 51Ea into arcuate elements, the arcuate elements being linked together by arches 53E, 53E. The arches 53E, 53E bow outwardly from the center and are elastically deformable towards the stoppers 25Ed, 25Ed.

Figure 27:
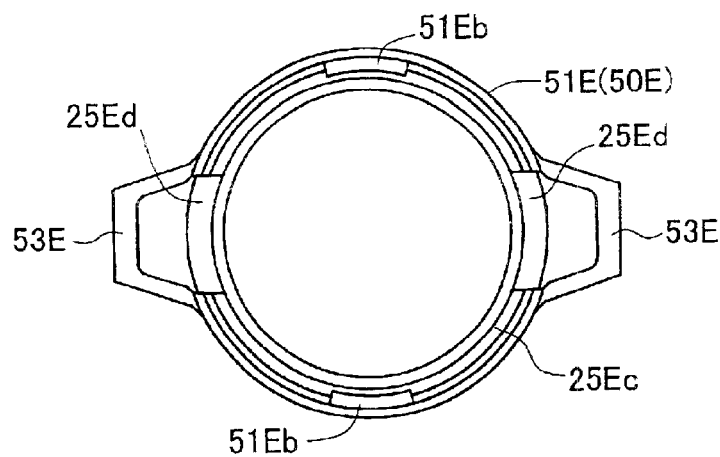
FIG. 27 shows the socket mounted on the fitting block.
Figure 28:
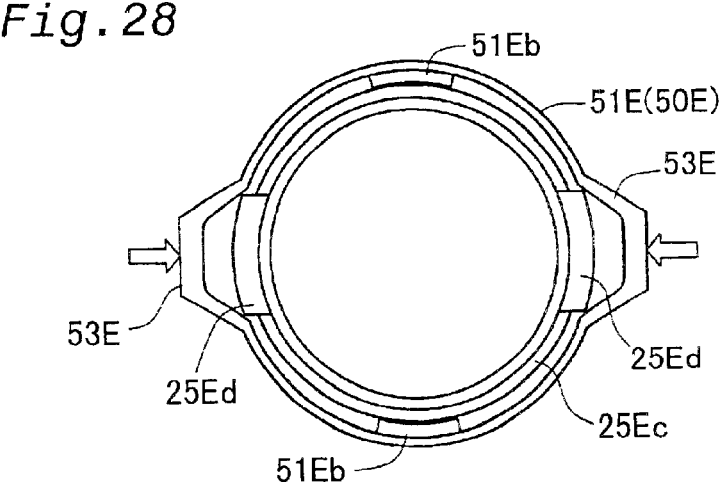
FIG. 28 shows the process for releasing the socket from the state shown in FIG. 18.

With the socket 50E mounted on the fitting block 24E, depicted in FIG. 27, when the arches 53E, 53E are pushed from the outside towards the stoppers 25Ed, 25Ed, as depicted in FIG. 28, the socket body 51E undergoes diametrical expansion so that the socket engagement catch 51Eb is released from the block engagement catch 25Ec. The amount of push by the arches 53E, 53E is restricted by the stoppers 25Ed, 25Ed, and since the amount of diametrical expansion of the socket body 51E is determined by the amount of deformation of the arches 53E, 53E, the socket body 51E does not undergo excessive diametrical expansion and is not damaged.

As the socket body 51E is linked by the arches 53E, 53E, the socket body 51E has high mechanical strength and latching force against the fitting block 24E and the corrugated portion.

As a modification of the fifth embodiment, rather than applying external force to the two arches 53E, 53E, the diametrical expansion projections 25Cg, 25Cg and the guides 54C, 54C could be provided as in the third embodiment (see FIG. 20), or the diametrical expansion projection 25Dg and the guide 54D could be provided as in the fourth embodiment (see FIG. 23) to enable diametrical expansion by means of rotating the socket.

(6) Sixth Embodiment

Figure 29:
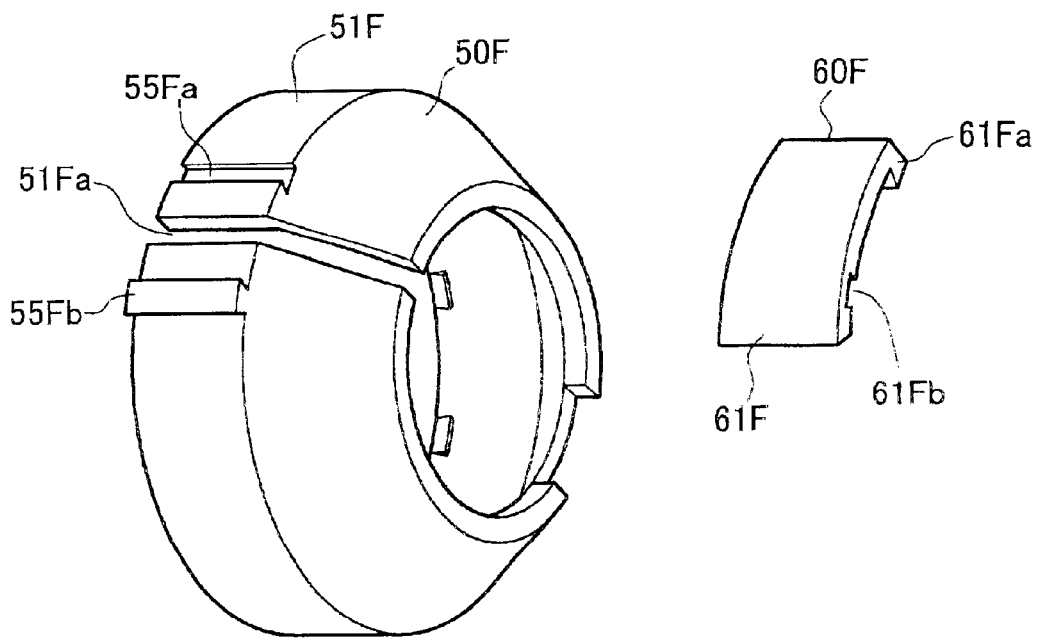
FIG. 29 is a perspective view of a socket and a diametrical expansion restricting member pertaining to a sixth embodiment.

FIG. 29 is a perspective view of a socket 50F and diametrical expansion restricting member 60F pertaining to a sixth embodiment. The sixth embodiment features the diametrical expansion restricting member 60F arrangement for restricting diametrical expansion of the socket 50F. In FIG. 29, the outside rim of a socket body 51F of the socket 50F has formed thereon a first detaining catch 55Fa and a second detaining catch 55Fb, situated to either side of a slit 51Fa. The first detaining catch 55Fa takes the form of a slot with a narrow opening extending in the direction of insertion, and has a catch at its open end. The second detaining catch 55Fb is a catch of bar configuration extending in the direction of insertion and constricted at its base.

The diametrical expansion restricting member 60F is a component for restricting diametrical expansion of the socket 50F by engaging the first and second detaining catchs 55Fa, 55Fb, and comprises an arcuate restricting member body 61F, and a mating catch 61Fa and mating slot 61Fb which project from the inside rim of restricting member body 61F. The mating catch 61Fa mates with the first detaining catch 55Fa and the mating slot 61Fb mates with the second detaining catch 55Fb.

Figure 30:
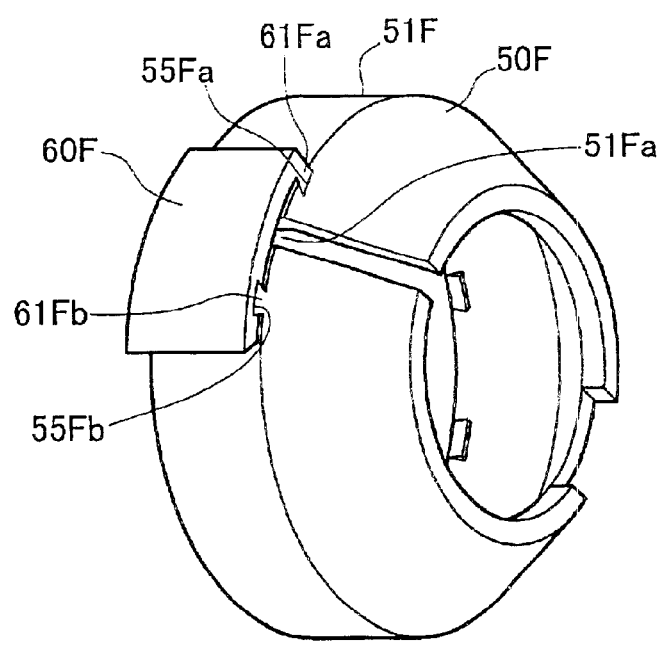
FIG. 30 shows the socket mounted on the fitting block.

With the socket 50F assembled together with the fitting block and hose, the mating catch 61Fa and the mating slot 61Fb of the diametrical expansion restricting member 60F are mated with the first detaining catch 55Fa and the second detaining catch 55Fb as depicted in FIG. 30, to attach the diametrical expansion restricting member 60F to the outside of the socket 50F, restricting diametrical expansion of the socket 50F. With this arrangement, application of significant pulling force on the hose does not result in diametrical expansion of the socket 50F, thus preventing the hose from decoupling.

With the socket 50F completely installed on the block body, the outside diameter of the socket 50F is equal to a predetermined dimension, and as the diametrical expansion restricting member 60F cannot be attached to the socket 50F unless it has this dimension, improper installation is prevented.

(7) Seventh Embodiment

Figure 31:
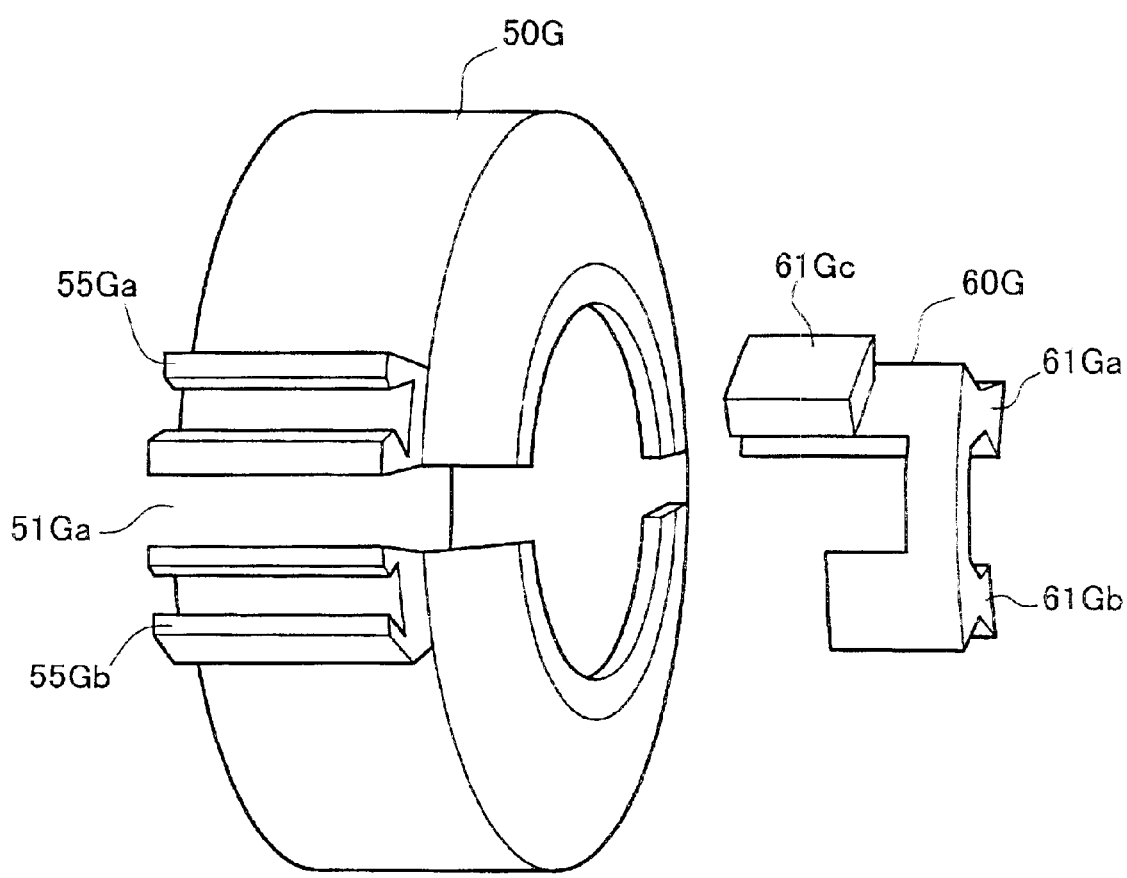
FIG. 31 is a perspective view of a socket and a diametrical expansion restricting member pertaining to a seventh embodiment.

FIG. 31 is a perspective view of a socket 50G and a diametrical expansion restricting member 60G pertaining to a seventh embodiment. The seventh embodiment is a modification of the sixth embodiment. A first and second detaining catch 55Ga, 55Gb, formed on the outside rim of the socket 50G, are situated to either side of a slit 51Ga, and these are of identical configuration, namely, catches projecting from either side of a guide slot. The diametrical expansion restricting member 60G has on its inside rim flared catch projections 61Ga, 61Gb for interlocking with the first and second detaining catch 55Ga, 55Gb. The diametrical expansion restricting member 60G also has a push operation portion 61Gc projecting from its outside rim. With this embodiment as well, the diametrical expansion restricting member 60G prevents diametrical expansion of the socket 50G to prevent the hose from decoupling. The push operation portion 61Gc facilitates attachment and release of the socket 50G.

(8) Eighth Embodiment

Figure 32:
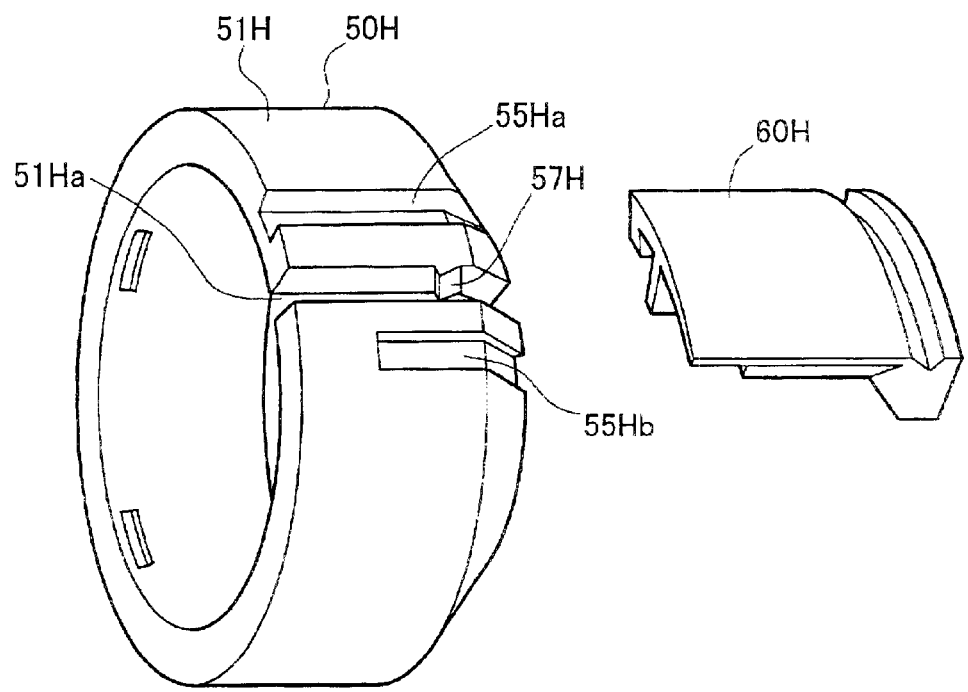
FIG. 32 is a perspective view of a socket and a diametrical expansion restricting member pertaining to an eighth embodiment.
Figure 33:
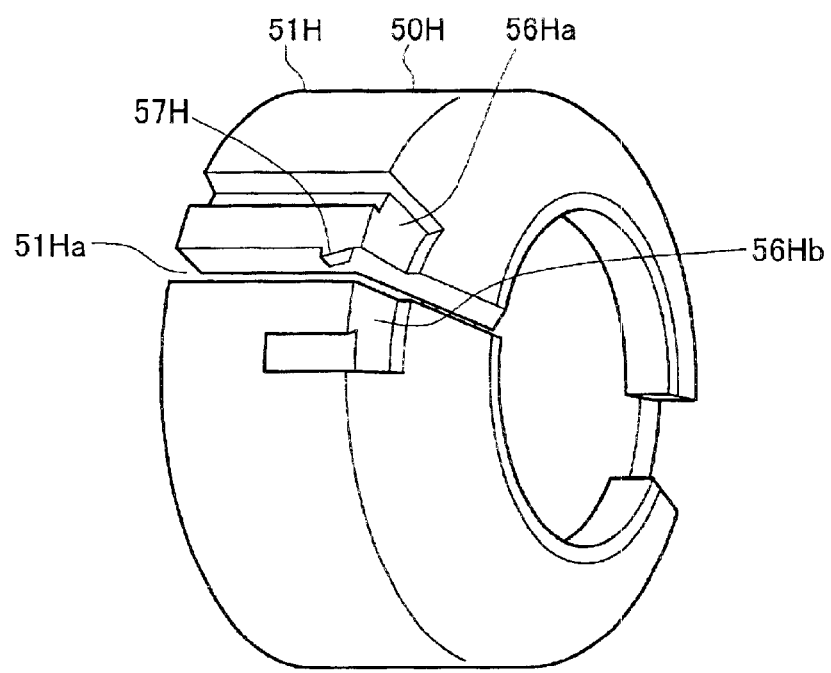
FIG. 33 is a perspective view of socket.

FIG. 32 is a perspective view of a socket 50H and a diametrical expansion restricting member 60H pertaining to an eighth embodiment; and FIG. 33 is a perspective view of the socket 50H. The eighth embodiment is a modification of the sixth embodiment having the function of temporarily attaching the diametrical expansion restricting member 60H to the socket 50H.

On the outer peripheral portion of a socket body 51H of the socket 50H are formed a first detaining catch 55Ha and a second detaining catch 55Hb of slot configuration. The slot of the second detaining catch 55Hb is shorter than the first detaining catch 55Ha. A recess 56Ha and recess 56Hb linked respectively to the first and second detaining catch 55Ha, 55Hb are formed on the socket body 51H. On the side wall of the socket 50H in proximity to a slit 51Ha is formed a temporary attachment projection 57H for temporarily attaching the diametrical expansion restricting member 60H.

Figure 34:
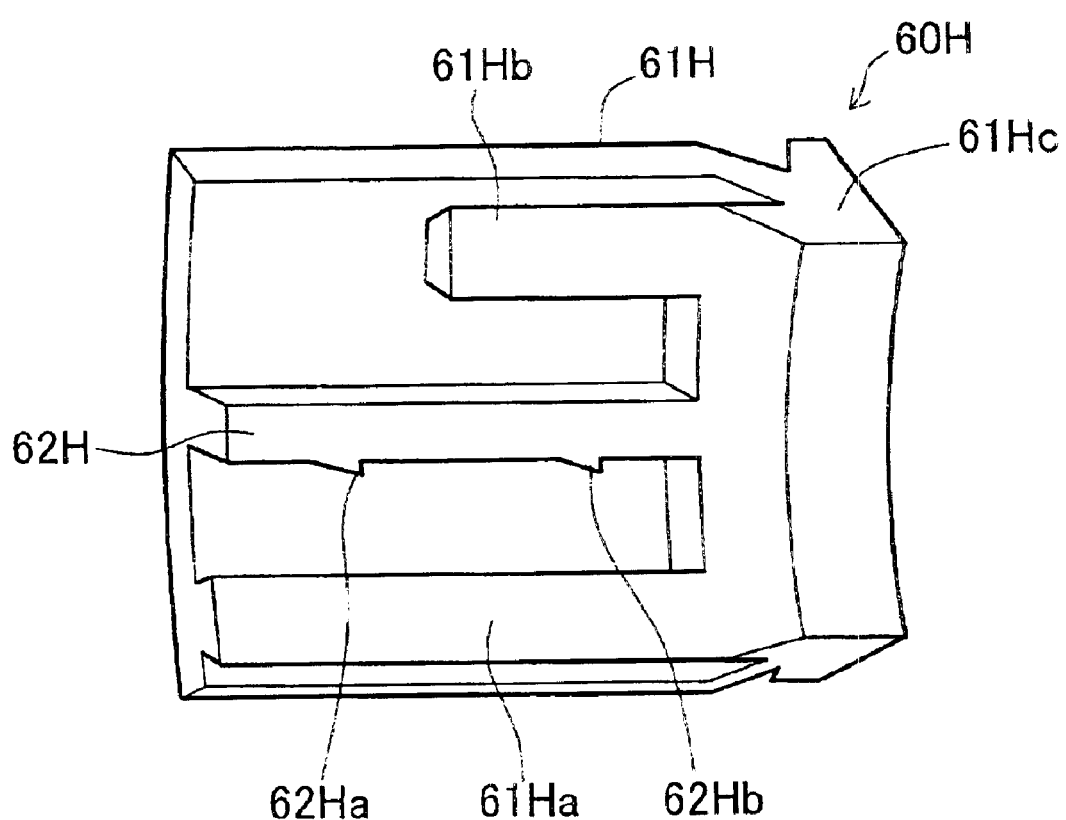
FIG. 34 is a perspective view of the diametrical expansion restricting member seen from the inside.

FIG. 34 is a perspective view of a diametrical expansion restricting member 60H seen from the inside. The diametrical expansion restricting member 60H has formed on the inside rim of a restricting member body 61H, a first catch projection 61Ha and a second catch projection 61Hb. The first and second catch projections 61Ha, 61Hb are formed to mate with the slots of different length of the first and second detaining catches 55Ha, 55Hb depicted in FIG. 33, i.e., the second catch projection 61Hb is shorter than the first catch projection 61Ha. Between the first and second catch projections 61Ha, 61Hb is arranged a guide bar 62H. The guide bar 62H is configured to insert into the slit 51Ha. On a side face of the guide bar 62H are formed a first and second temporary attachment projections 62Ha, 62Hb for temporarily engaging the temporary attachment projection 57H of the socket 50H.

Figure 35A:
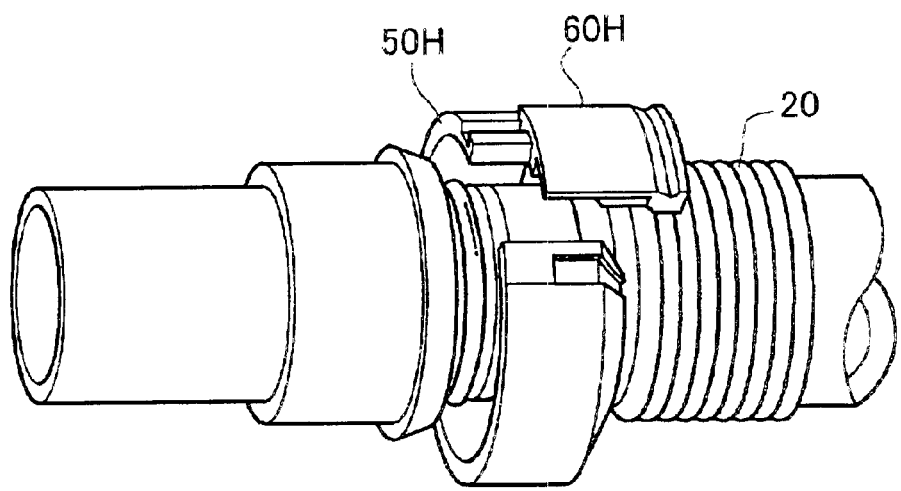
FIG. 35A is a perspective view illustrating the temporary attachment position of the diametrical expansion restricting member.

FIG. 35A is a perspective view illustrating the temporary attachment position of the diametrical expansion restricting member 60H. At the temporary attachment position of the diametrical expansion restricting member 60H (FIG. 35A), the first temporary attachment projection 62Ha(FIG. 34) rides over the temporary attachment projection 57H (FIG. 33) so as to be is situated between the first temporary attachment projection 62Ha and the second temporary attachment projection 62Hb. In this state, the first catch projection 61Ha is inserted midway through the first detaining catch 55Ha, and the second catch projection 61Hb has not yet entered the second detaining catch 55Hb.

Figure 35B:
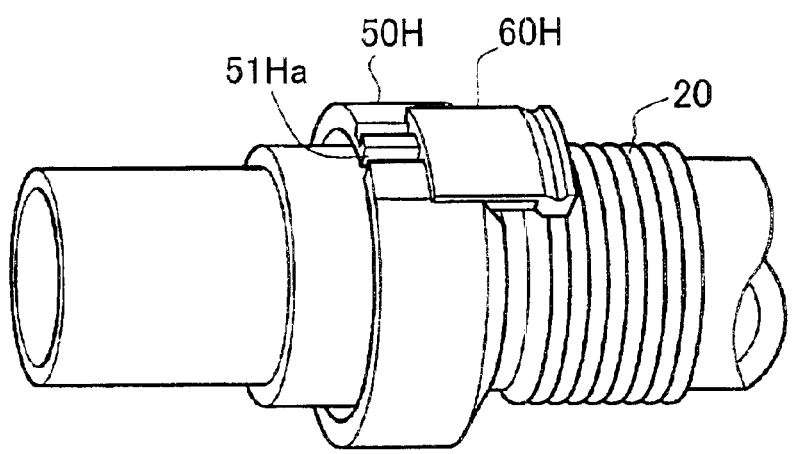
FIG. 35B shows the process for connecting the hose.

To secure the socket 50H and the hose, the diametrical expansion restricting member 60H is then pushed from the temporary attachment position further inward in the axial direction of the socket 50*h* so that the slit 51Ha in the socket 50 constricts in width to bring about constriction in diameter, as shown in FIG. 35B. That is, the diametrical expansion restricting member 60H is pushed further inward from the position at which the first catch projection 61Ha has entered partway the slot of the first detaining catch 55Ha, pushing the second catch projection 61HB into the second detaining catch 55Hb. This reliably detains the hose without the diametrical expansion restricting member 60H expanding the diameter of the socket 50H.

According to this embodiment, by temporarily attaching the diametrical expansion restricting member 60H to the socket 50H during shipping, the socket 50H and the diametrical expansion restricting member 60H can be handled as a single unit, thereby facilitating shipping and attachment.

(9) Ninth Embodiment

Figure 36:
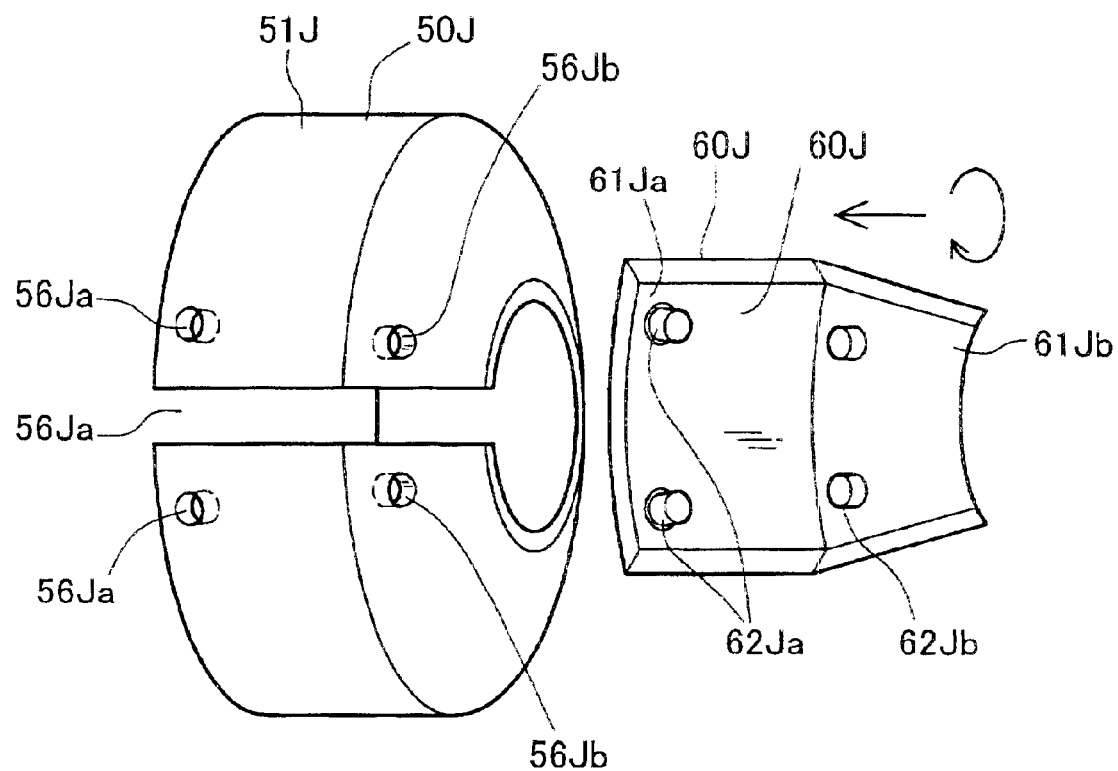
FIG. 36 is a perspective view of a socket and a diametrical expansion restricting member pertaining to a ninth embodiment.

FIG. 36 is a perspective view of a socket 50J and a diametrical expansion restricting member 60J pertaining to a ninth embodiment. The ninth embodiment features a different configuration for the diametrical expansion restricting member 60J. The diametrical expansion restricting member 60J is flipped 180°. On the outside peripheral face of a socket body 51J of the socket 50J are formed engaging holes 56Ja, 56Ja, and on its front face are formed engaging holes 56Jb, 56Jb, situated to either side of slit 51Ja. The diametrical expansion restricting member 60J comprises a diametrical expansion restricting member 60J having deflected faces 61Ja, 61Jb that conform to the outside peripheral face and front face of the socket body 51J. From the inside peripheral face of the diametrical expansion restricting member 61J projects engaging pins 62Ja, 62Jb that fit into engaging holes 56Ja, 56Ja.

In the present embodiment, the engaging pins 62Ja, 62Jb of the diametrical expansion restricting member 60J are aligned with the socket 50J and inserted into the engaging holes 56Ja, 56Ja, thereby attaching the diametrical expansion restricting member 60J to the socket 50J while at the same time securing the hose.

(10) Tenth Embodiment

Figure 37:
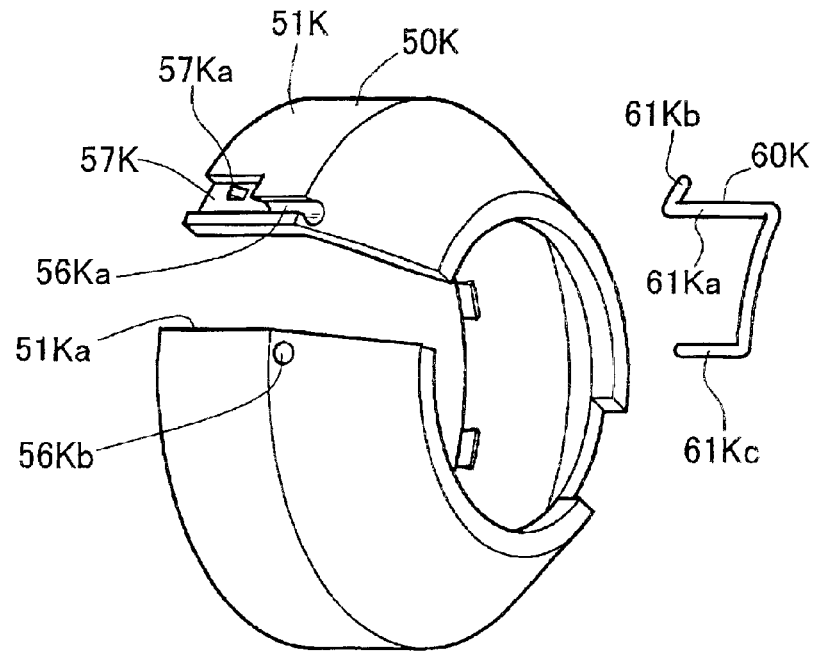
FIG. 37 is a perspective view of a socket and a diametrical expansion restricting member pertaining to a tenth embodiment.

FIG. 37 is a perspective view of a socket 50K and a diametrical expansion restricting member 60K pertaining to a tenth embodiment. The tenth embodiment features a configuration for the diametrical expansion restricting member 60K produced by bending steel wire. The socket 50K has formed therein an hole and a groove for mounting the diametrical expansion restricting member 60K That is, a socket body 51K has an insertion groove 56Ka extending along a slit 51Ka; a recess 57K communicating with one end of the insertion groove 56Ka; and an insertion hole 56Kb extending in the axial direction, some distance away from the slit 51Kg. Within the recess 57K is formed a detent 57Ka for mating with and detaining one edge of the diametrical expansion restricting member 60K.

The diametrical expansion restricting member 60K is a shape produced by bending steel wire, and has a linear insertion portion 61Ka for insertion into the insertion groove 56Ka. A first end of the linear insertion portion 61Ka serves as a detent end 61Kb engaged by the detent 57Ka in the recess 57K. The other end of the linear insertion portion 61Ka serves as an insertion end 61Kc for insertion into the insertion hole 56Kb, bent so that the element straddles the slit 51Ka.

Figure 38:
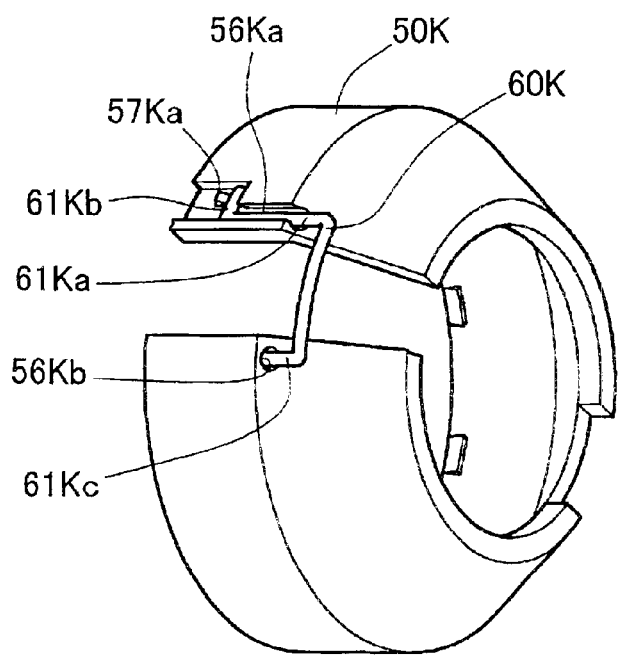
FIG. 38 is a perspective view illustrating the diametrical expansion restricting member in the temporary attachment position.
Figure 39:
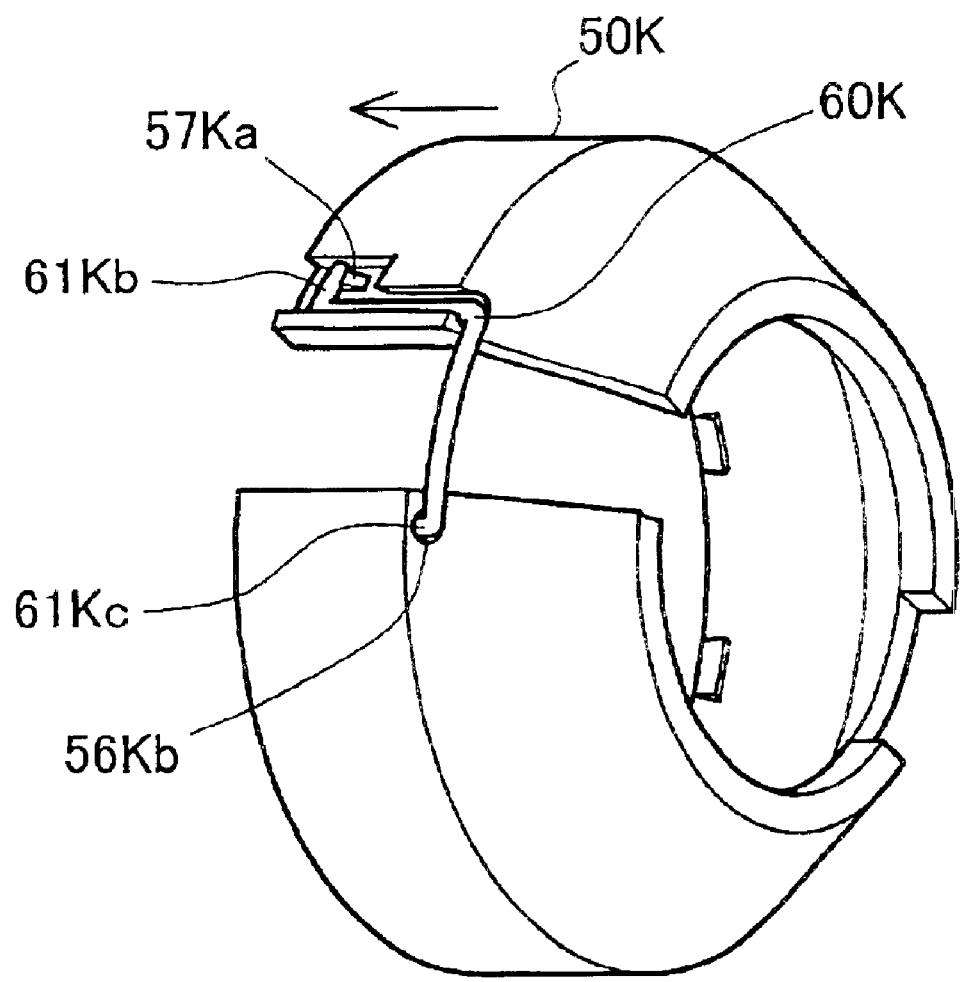
FIG. 39 shows the diametrical expansion restricting member mounted on the socket.

FIG. 38 is a perspective view illustrating the diametrical expansion restricting member 60K in the temporary attachment position. In the diametrical expansion restricting member 60K temporary attachment position, the linear insertion portion 61K is pushed into the insertion groove 56Ka, the detent end 61Kb has not yet ridden over the detent 57Ka, and the insertion end 61Kc is not yet inserted into the insertion hole 56Kb. In this way the diametrical expansion restricting member 60K is temporarily attached to the socket 50K in such a way that chattering is not produced. As depicted in FIG. 39, pushing the diametrical expansion restricting member 60K further in the direction indicated by the arrow causes the detent end 61Kb to ride over the detent 57Ka, and insertion end 61Kc to insert into the insertion hole 56Kb, whereby the diametrical expansion restricting member 60K restricts the diametrical expansion of the socket 50K.

Eleventh Embodiment

Figure 40:
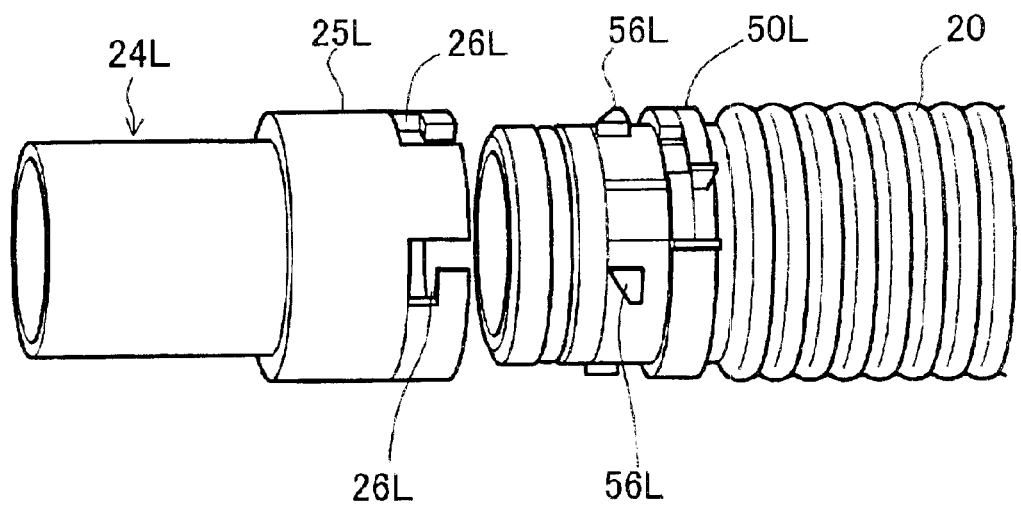
FIG. 40 is a perspective view showing a hose prior to coupling with a fitting block by means of a socket pertaining to a eleventh embodiment.
Figure 41:
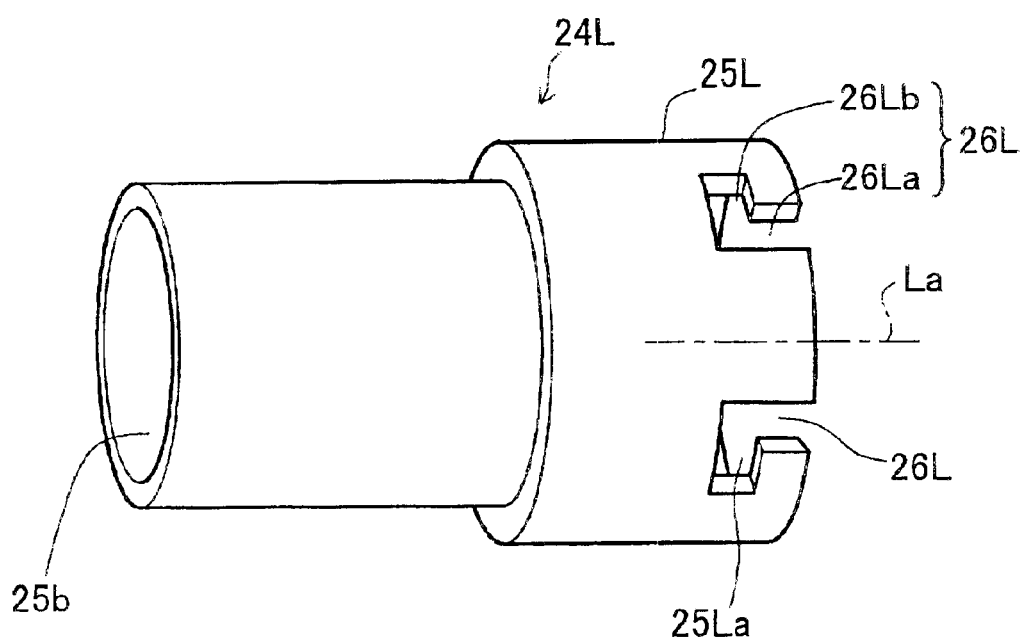
FIG. 41 is a perspective view showing the fitting block.

FIG. 40 is a perspective view showing a hose 20 prior to coupling with a fitting block 24L by a socket 50L; FIG. 41 is a perspective view showing the fitting block 24L. In FIG. 41, the fitting block 24L comprises a round tubular block body 25L and a flange 26 projecting outwardly from the end of the block body 25L.

The open end of the block body 25L is provided at two locations (180° apart on a circle centered about the axis) with a pair of block engagement slots 26L, 26L for connection of the socket 50L. The Block engagement slots 26L, 26L are of "L" shaped configuration having a guide slot 26La extending in the axial direction and a detent slot 26Lb extending in the direction of the circumference from the base of the guide slot 26La. The block engagement slots 26L, 26L are laterally symmetrical about a straight line La.

Figure 42:
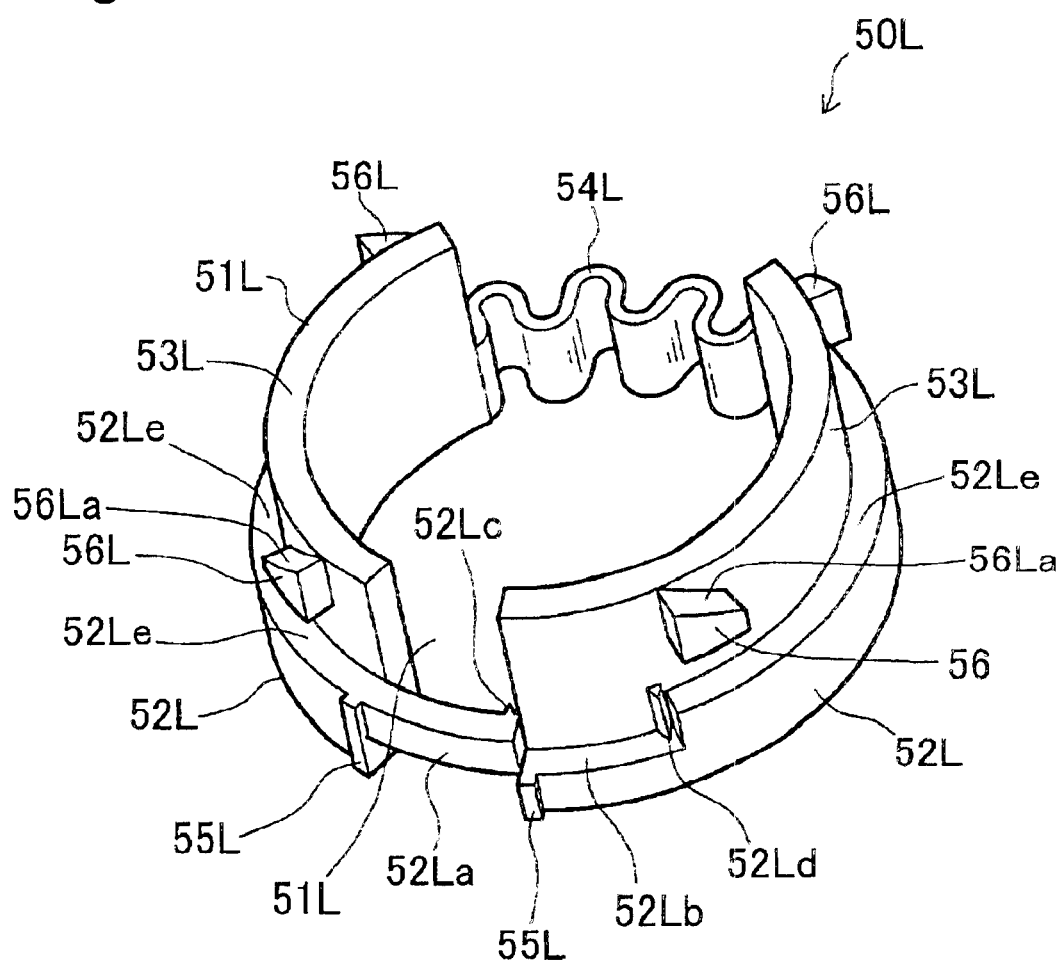
FIG. 42 is a perspective view of the socket.

FIG. 42 is a perspective view of socket 50L. The socket 50L is an element for engaging the corrugated portion of hose 20 and interconnection with the fitting block 24L. The socket 50L comprises an annular socket body 51L having a slit 51La. The socket body 51L is slightly narrower in width than the corrugation grooves so as to enable forcible insertion into the corrugation grooves of the corrugated portion. The socket body 51L comprises arcuate large-diameter portions 52L, 52L and small-diameter portions 53L, 53L that are thinner than the large-diameter portions 52L, 52L and form an annular step 52Le, and a corrugated linking portion 54L is expandably and contractably linked between large-diameter portions 52L, 52L. One end of the large-diameter portion 52L is an extension portion 52La that extends the across slit 51La; the other large-diameter portion 52L is a guide recess 52Lb for slidably guiding the extension portion 52La. A latching projection 52Lc is formed at the inside distal end of the extension portion 52La, while on the guide recess 52Lb is formed a latching projection 52Ld for interlocking with the latching projection 52Lc. The socket 50L is fabricated of material expandable and contractable at the linking portion 54L, such as polypropylene, polyamide, or polycarbonate.

On the outside walls of the small-diameter portions 53L, 53L are situated socket engagement catches 56L, 56L at two axially symmetrical locations. The socket engagement catches 56L, 56L are trapezoidal projections for attaching the socket 50L to fitting block 24L by interlocking with the block engagement slots 26L, 26L, and have tapered faces 56La sloping upward towards slit 51La. The juxtaposed ends of the large-diameter portions 52L, 52L to either side of slit 51La have push operation portions 55L, 55L projecting therefrom. The push operation portions 55L, 55L are formed to enable force to be applied with the fingers to constrict the width of the slit 51La, when the socket body 51L expands at the linking portion 54L, and the extension portion 52La is guided into the guide recess 52Lb.

The procedure for connecting the hose 20 to the fitting block 24L, a sealing member is installed in the corrugation groove on the hose 20, and the end of the hose 20 is forced into the socket 50L through the opening thereof. During this process, the socket body 51L expands in diameter due to the linking portion 54L, facilitating attachment of the corrugated portion, and becoming forced into the corrugation groove of the corrugated portion. The socket 50L mounted on the hose 20 is then forced into the fitting block 24L.

Figure 43:
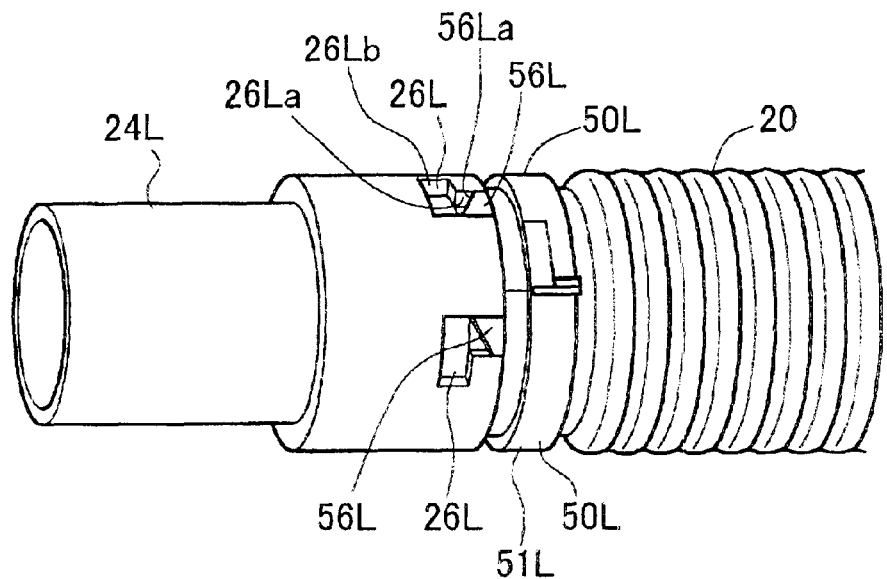
FIG. 43 is a perspective view illustrating the process of attachment to the fitting block by the socket.

As shown in FIG. 40, with the socket 50L installed in the corrugation groove of the hose 20, the socket 50L is forced into fitting block 24L. FIG. 43 is an illustrative diagram illustrating the linking process of the socket body 51L and socket 50L. As shown in FIG. 43, when the socket 50L is aligned with the open end of the fitting block 24L, the tapered faces 56La of the socket engagement catches 56L, 56L come into abutment against the inside edges of the block engagement slots 26L, 26L. With further pushing of the socket 50L, the gap between the engagement catches 56L, 56L is constricted as the tapered faces 56La slide along the inner edges of the block engagement slots 26L, 26L. The socket 50L moves along the end of the hose 20 by expansion of the corrugated linking portion 54L (FIG. 42). The socket engagement catches 56L, 56L are then positioned in the block engagement slots 26L, 26L, and with further pushing of the socket 50L, the socket engagement catches 56L, 56L move through the guide slots 26La. When the guide slots 26La reach detent slots 26Lb, the socket engagement catches 56L, 56L move in the circumferential direction through the detent slots 26Lb by diametral expansion of the socket 50L under the restoring force of the linking portion 54L (FIG. 42), thereby detaining the fitting block 24L.

According to the hose coupling assembly pertaining to this embodiment, by premounting the fitting block 24L on the engine block, the hose coupling procedure may be accomplished by means of a simple procedure that simply involves pushing the socket 50L into the fitting block 24L.

The hose coupling assembly of this embodiment offers the following advantages.

(1) The socket 50L can be preinstalled on hose 20 and then simply pushed into the fitting block 24L to easily mount the hose in the fitting block 24L.

(2) With the socket 50L preinstalled on the fitting block 24L, the area of maximum outside diameter of the socket 50L is the large-diameter portion 52L, and as the large-diameter portion 52L has about the same outside diameter as the block body 25L, it can easily pass through confined spaces in the engine room.

(3) Since the socket engagement catches 56L, 56L are accommodated within the block engagement slots 26L and do not project out beyond the outside face of the block body 25L, the socket engagement catches 56L, 56L are not subjected to external force, thus preventing the socket 50L from coming off.

(4) During the process of connecting the socket 50L, socket 50L, by expanding the corrugations of the linking portion 54L, maintains the outside diameter of the socket body 51 and simply shifts position in the circumferential direction, facilitating the coupling process.

(5) The socket 50L is integrally molded by means of resin injection, and is thus easily fabricated.

Figure 44:
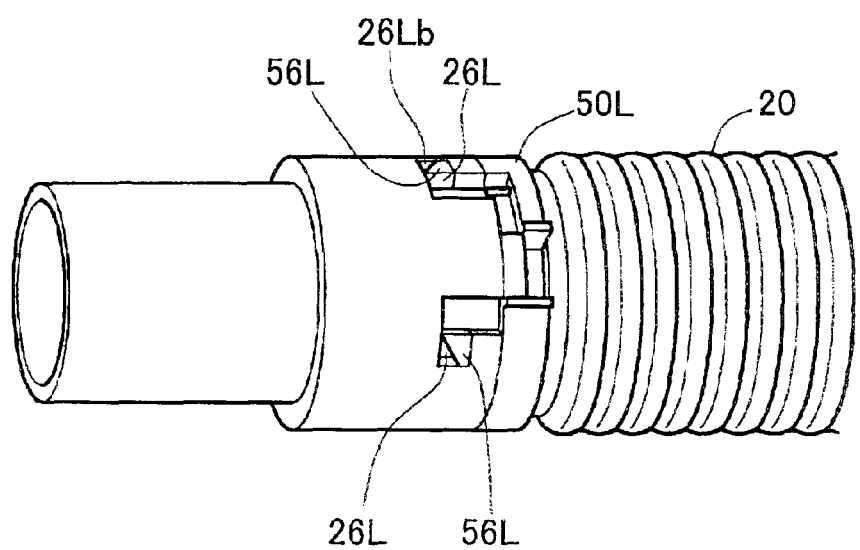
FIG. 44 is a perspective view illustrating the fitting block attached by the socket.

The procedure for detaching the socket 50L from the fitting block 24L is now described. From the state depicted in FIG. 44, when force is applied in the constricting direction to the push operation portions 55L of socket 50L, the latching projection 52Lc shown in FIG. 42 engages the latching projection 52Ld so that socket 50L is positioned with the linking portion 54L expanded. In this state, the socket engagement catches 56L are positioned released from the block engagement slots 26L, 26L (the state depicted in FIG. 43). That is, while the socket engagement catches 56L, 56L are detained securely within the block engagement slots 26L, 26L, the socket 50L may be easily detached from the fitting block 24L by applying force in the constricting direction to the push operation portions 55L.

Thus, according to the present embodiment, the socket 50L can be preinstalled on the corrugated portion and then attached by being pushed into fitting block 24L, and can be detached from the fitting block 24L by applying force in the constricting direction to the push operation portions 55L, without the need for special tools, thus providing an easy attachment and detachment operation.

(2) Twelfth Embodiment

Figure 45:
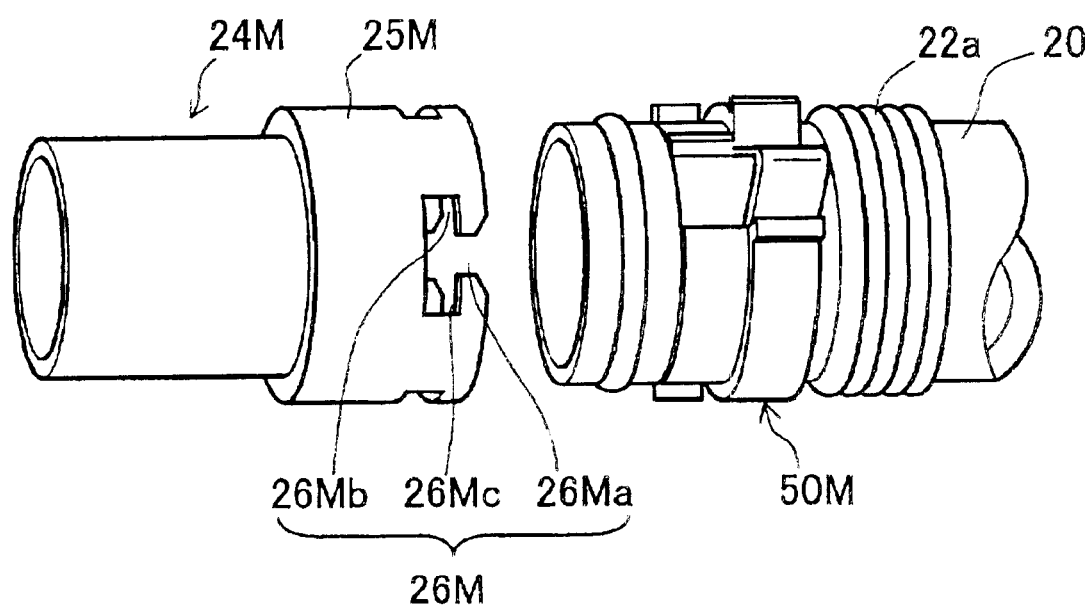
FIG. 45 is a perspective view pertaining to a twelfth embodiment, showing hose prior to coupling with a fitting block by means of a socket.

A twelfth embodiment is depicted in FIGS. 45 to 50. This twelfth embodiment features a socket 50M that has no split. FIG. 45 is a perspective view showing a hose coupling assembly prior to coupling with a fitting block 24M by the socket 50M.

In FIG. 45, the open end of the block body 25M of the fitting block 24M is provided at four locations—at 90° intervals along the circumference—with block engagement slots 26M for connection of socket 50M. The block engagement slots 26M comprise a detent slot 26Mb and a detent slot 26Mc extending to either side of the base end of the guide slot 26Ma.

Figure 46:
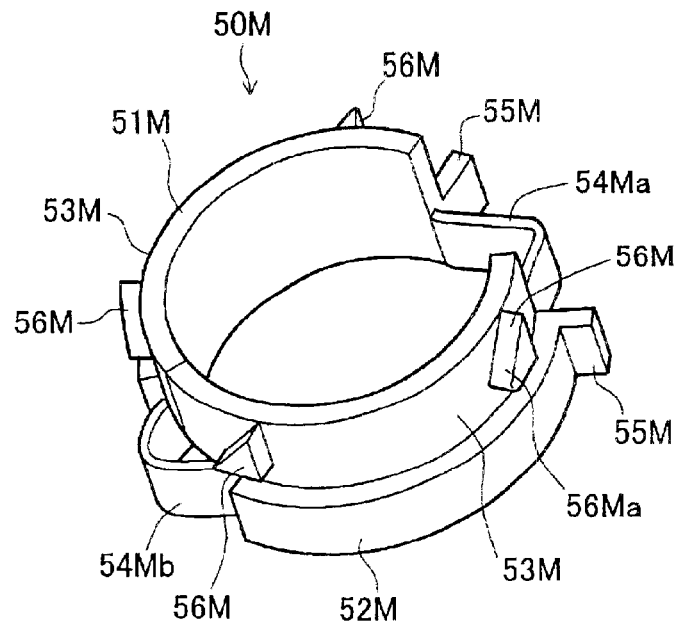
FIG. 46 is a perspective view showing the socket.
Figure 47:
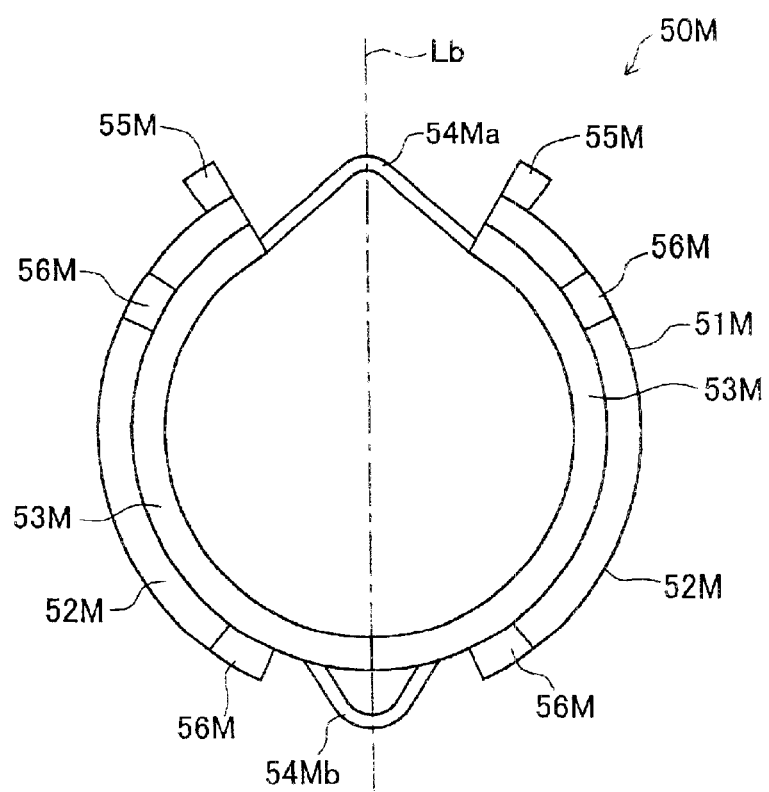
FIG. 47 is a side view showing the socket.

FIG. 46 is a perspective view of the socket 50M; FIG. 47 is a side view of socket 50M. The socket 50M comprises an annular socket body 51M. The socket body 51M comprises split arcuate large-diameter portions 52M, 52M, and split small-diameter portions 53M that are thinner than the large-diameter portions 52M, 52M, with the large-diameter portions 52M, 52M being expandably and contractably linked at both ends by means of linking portions 54Ma, 54Mb. On the outside walls of the small-diameter portions 53M are situated socket engagement catches 56M at four locations symmetrical about line Lb. The engagement catches 56M are arranged symmetrically to either side of the linking portion 54Ma and the linking portion 54Mb, and have tapered faces 56Ma (FIG. 46) on the sides facing away from the linking portions 54Ma, 54Mb. The socket engagement catches 56M are rectangular projections for attaching the socket 50M to the fitting block 24M by engaging the four block engagement slots 26M shown in FIG. 45.

Figure 48:
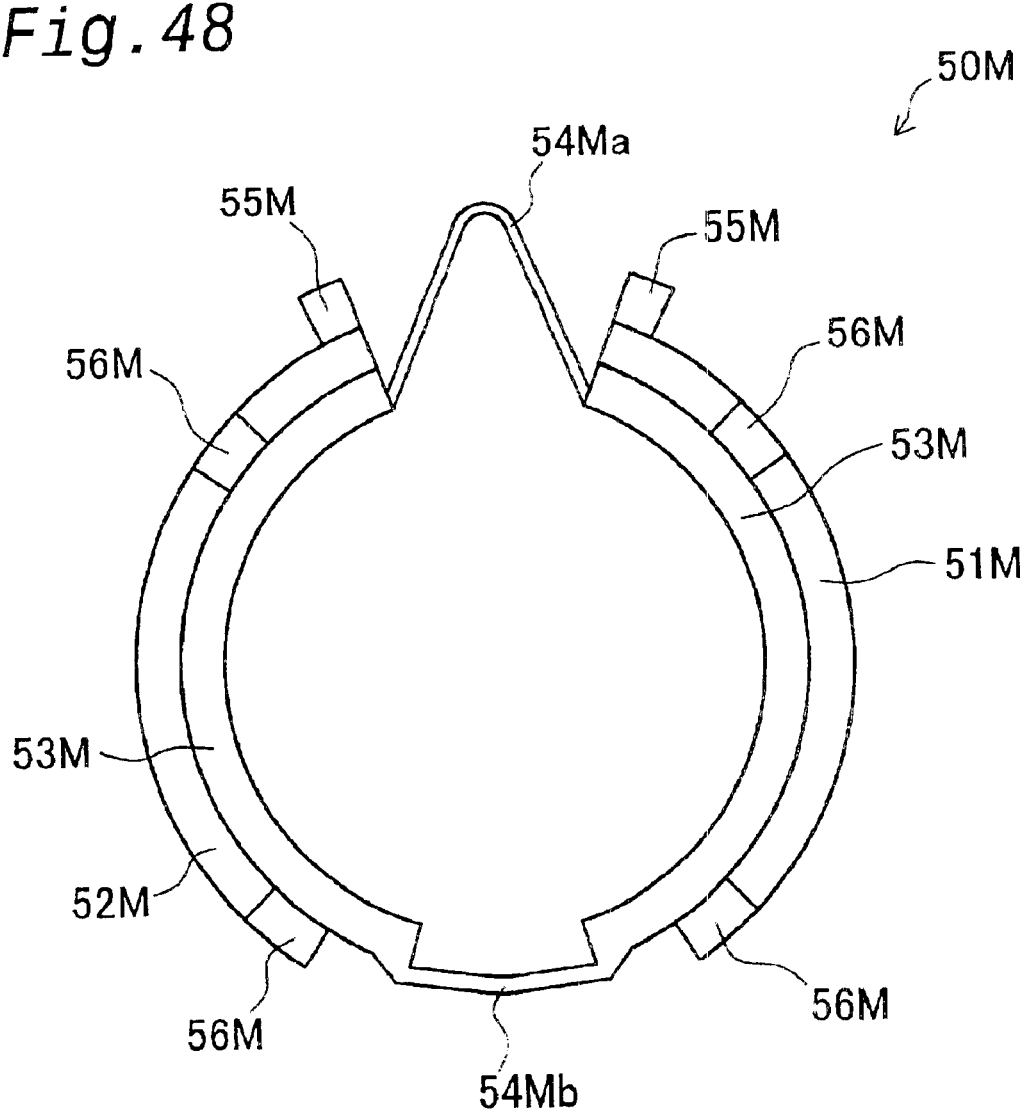
FIG. 48 shows the operation of the socket.

The ends of the large-diameter portions 52M, 52M at both sides of the linking portion 54Ma have push operation portions 55M, 55M projecting therefrom. The push operation portions 55M, 55M are formed to enable constricting force to be applied with the fingers, whereupon the linking portion 54Ma contracts and the inking portion 54Mb expands to shift the large-diameter portions 52M and small-diameter portions 53M in the circumferential direction to constrict the gap between opposing the socket engagement catches 56M, as shown in FIG. 48.

Figure 49:
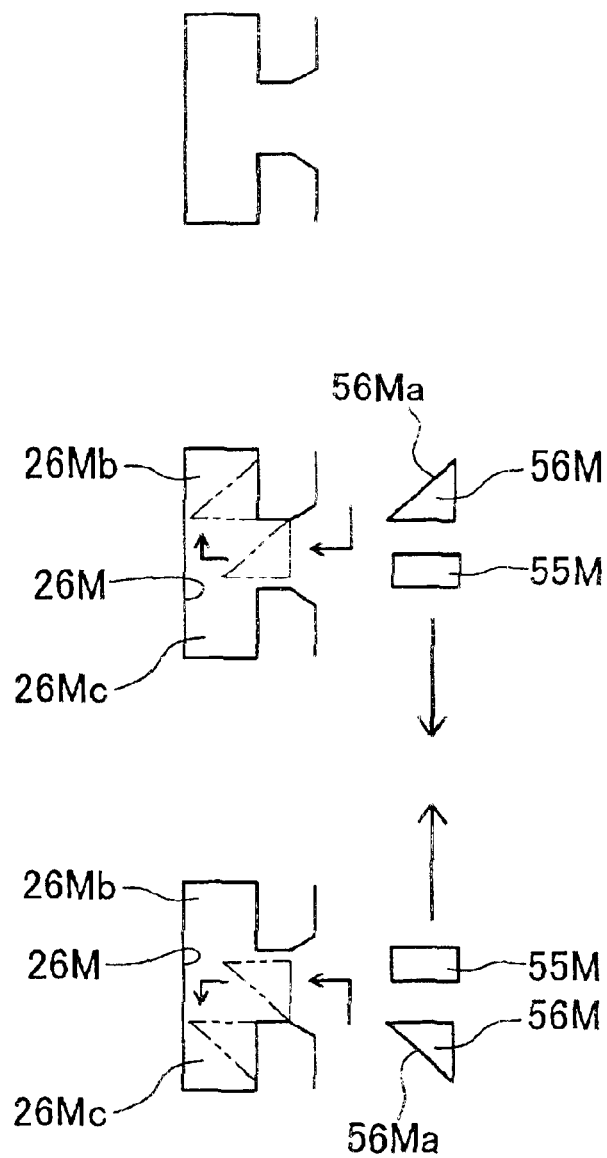
FIG. 49 shows the process of a linking fitting block and the socket.
Figure 51:
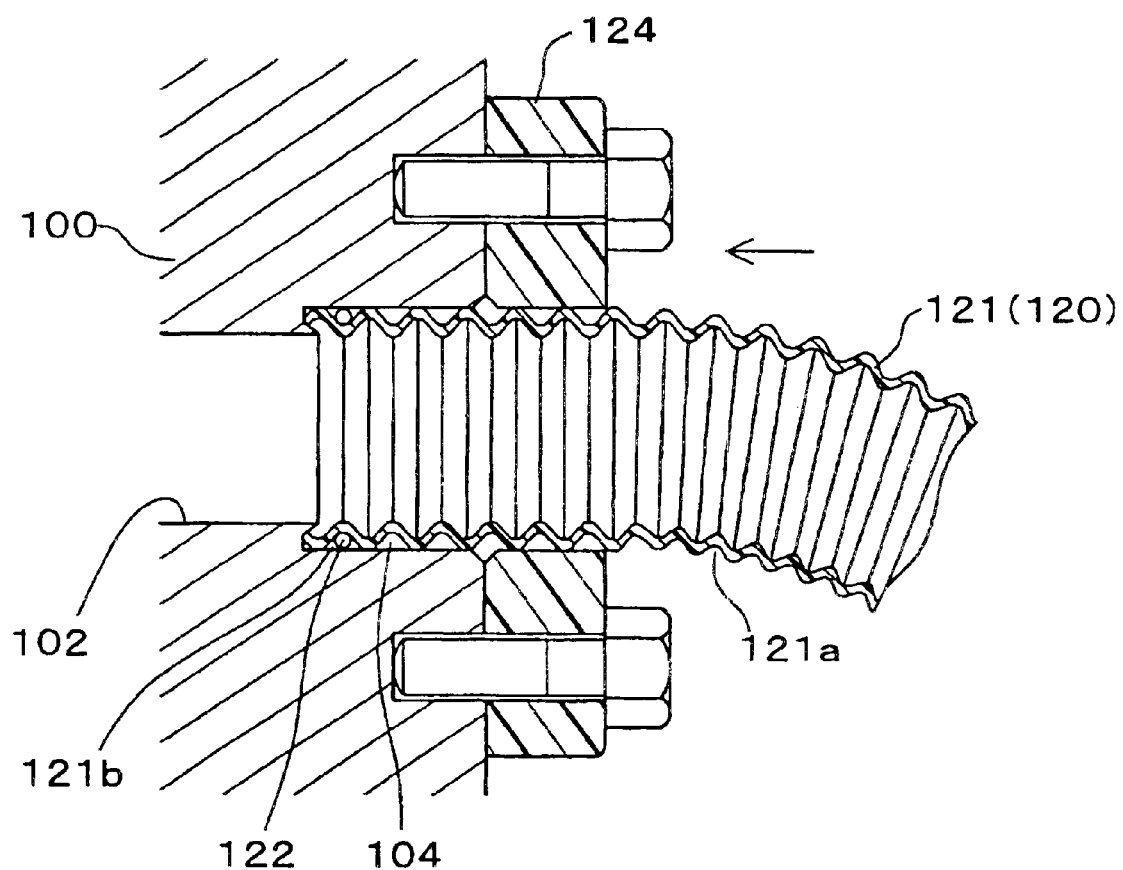
FIG. 51 is a sectional view of a hose coupling assembly taught in a prior art.
Figure 52:
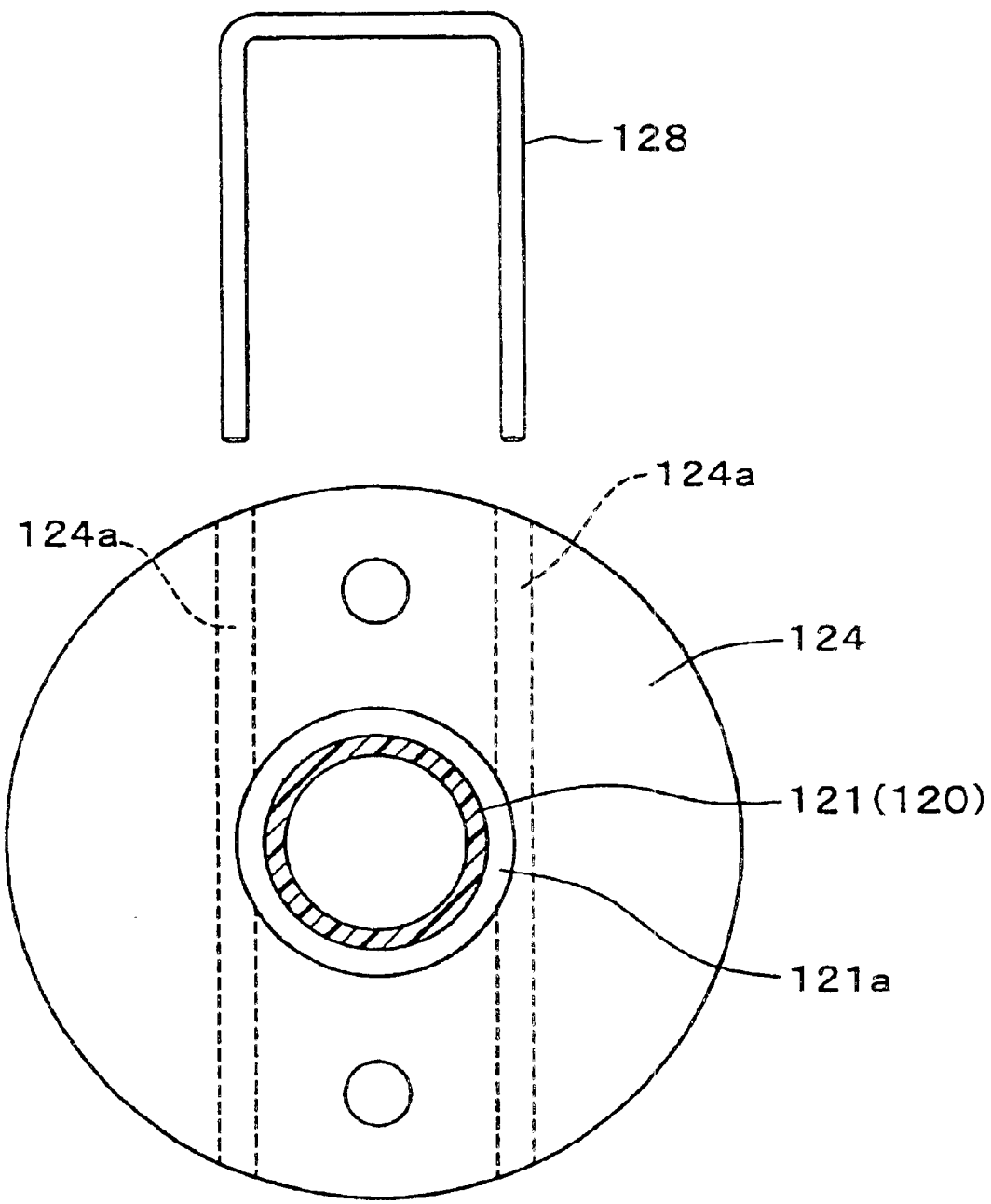
FIG. 52 shows the procedure for detaching the hose.

As shown in FIG. 45, with socket 50M installed in a corrugation groove 22a on a hose 20, the socket 50M is forced into the fitting block 24M to be attached to the fitting block 24M. FIG. 49 is an illustrative diagram illustrating the process of the linking fitting block 24M and socket 50M. In FIG. 49, the block engagement slots 26M are shown at all four locations, but only two of the four socket engagement catches 56M are shown.

When socket 50M, shown in FIG. 45, is aligned with the open end of the fitting block 24M, the tapered faces 56MLa of the socket engagement catches 56M, 56M come into abutment against the outside edges of the block engagement slots 26M, 26M. With further pushing of the socket 50M, the gap between the socket engagement catches 56M, 56M is constricted as the tapered faces 56Ma slide along the outer edges of the block engagement slots 26M, 26M. That is, as shown in FIG. 48, the corrugated linking portion 54Ma contracts and the lining portion 54Mb expands, whereby the socket engagement catches 56M, 56M become positioned at the guide slots 26Ma of the block engagement slots 26M, 26M and move along the guide slots 26Ma. Upon reaching the detent slots 26Mb, 26Mb, the socket engagement catches 56M, 56M move in the circumferential direction through the detent slots 26Mb, 26Mc as socket body 51M returns to its original shape under the restoring force of linking portion 54Ma and linking portion 54Mb, thereby detaining fitting block 24M, as shown in FIG. 47.

According to the hose coupling assembly pertaining to this embodiment, by preinstalling the socket 50M on the hose 20 and inserting it into the fitting block 24M, it is a simple matter to attach the hose 20 to the fitting block 24M.

FIG. 50 is an illustrative diagram illustrating a process for engaging the socket engagement catches 56M of the socket 50M within the block engagement slots 26M at a different location than in FIG. 49. With the socket 50M rotated 90° in the radial direction from the position in FIG. 49, when the socket engagement catches 56M are inserted into the block engagement slots 26M, the socket engagement catches 56M are inserted into the block engagement slots 26M situated at positions differing by 90°, as shown in FIG. 50. In other words, the socket 50M can be fitted with the socket engagement catches 56M at any location with respect to the block engagement slots 26M, providing exceptional ease of operation without losing one's bearings.

To detach the socket 50M from the fitting block 24M, with the socket 50M in the state depicted in FIG. 47, when force is applied in the constricting direction to the push operation portions 55M, 55M, in the reverse of the process depicted in FIG. 49, the socket engagement catches 56M, 56M are positioned released from the block engagement slots 26M, 26M. That is, while the socket engagement catches 56M, 56M are detained securely within the block engagement slots 26M, 26M, the socket 50M may be easily detached from the fitting block 24M by applying force in the constricting direction to the push operation portions 55M, 55M.

As the socket 50M is linked by the linking portions 54Ma, 54Mb, it does not readily undergo diametral expansion when the hose 20 is subjected to pulling force, and thus is not easily separated from the fitting block 24M.

As the socket 50M is a separate element from the hose, unlike the prior art, there is no need for an insert process, making for a simpler fabrication process.

While the invention has been described hereinabove with reference to certain preferred embodiments, it is not limited thereto, with various modifications, such as the following, being possible without departing from the scope of the invention.

The preceding embodiments describe application for connecting an engine and a radiator, but application in various other kinds of coupling assemblies is possible as well. The fitting block may constitute an assembly component or a separate element for assembly with an assembly component, or integrally formed; for example, the engine and radiator may be integrally formed or unified by joining by means of a process such as welding. In this case the fitting block may be fabricated of the same material as the assembly component, i.e. aluminum in the case of an engine, and resin in the case of a radiator.

The invention is not limited to the embodiments set forth hereinabove, various other embodiments being possible without departing from the spirit of the invention, such as defined by the following claims

What is claimed is:

1. A hose and coupling assembly comprising:
a hose, wherein the hose includes a corrugated portion that includes a plurality of grooves;
a coupling that connects the hose to an external passage;
a fitting member including (i) a passage portion having a receiving passage, and (ii) a first engagement catch projecting outwardly from an open peripheral end of the passage portion; and
a socket having:(i) an elastically and diametrically-expandable socket body for covering both of the fitting member and the corrugated portion; (ii) a second engagement catch, formed on the socket body, for engaging the first engagement catch; and (iii) a socket fitting portion, formed on an opening of the socket body, for engaging with at least a first one of the grooves of the corrugated portion; and
a sealing member located in a second one of the plurality of grooves for sealing between the corrugated portion and a wall of the external passage; wherein:
the socket is formed such that the connecting of the hose with the external passage with a tight seal is achieved by locating the sealing member in the second one of the grooves and engaging the socket fitting portion with the first one of the grooves and then by pressing the socket attached to the corrugated portion toward the fitting member to engage the second engagement catch with the first engagement catch;
disengagement of the second engagement catch from the first engagement catch is achieved by expanding the diameter of the socket body; and
the entire socket expands while the socket is pressed toward the fitting member.

2. The hose and coupling assembly according to claim 1, wherein the socket body has a slit across the entirety of a length of the socket to provide a C-shaped cross section.

3. The hose and coupling assembly according to claim 1, wherein the fitting member comprises a diametrical expansion projection for causing the socket body to expand due to rotation of the socket body relative to the fitting member.

4. The hose and coupling assembly according to claim 3, wherein the socket body comprises a guide for guiding the diametrical expansion projection.

5. A hose and coupling assembly comprising:
a hose, wherein the hose includes a corrugated portion that includes a plurality of grooves
a coupling that connects the hose to an external passage;
a fitting member, which includes a receiving passage and a first engagement catch, wherein the first engagement catch projects outwardly from an end of the fitting member; and
a generally C-shaped socket, wherein the C-shaped socket includes:
an elastically and diametrically-expandable socket body for covering the fitting member and the corrugated section;
a slit formed in the socket, wherein the slit permits the socket to expand diametrically;
a second engagement catch, formed on the socket body, for engaging the first engagement catch; and
a socket fitting portion, formed on an opening of the socket body, for engaging with at least a first one of the grooves of the corrugated portion; and
a sealing member located in a second one of the plurality of grooves for sealing between the corrugated portion and a wall of the external passage; wherein:
the socket is formed such that connection of the hose with the external passage with a tight seal is achieved by locating the sealing member in the second one of the grooves and engaging the socket fitting portion with the first one of the grooves and then by pressing the socket, which is attached to the corrugated section, toward the fitting member to engage the second engagement catch with the first engagement catch, wherein the diameter of the socket increases and separation occurs at the slit when the socket is pressed axially toward the fitting member; and
disengagement of the second engagement catch from the first engagement catch is achieved by expanding the diameter of the socket body.

6. The hose and coupling assembly according to claim 5, wherein the separation at the slit and the expansion of the socket is caused by engagement between the first engagement catch and the second engagement catch when the socket is pressed axially toward the fitting member.

* * * * *